United States Patent
Nam et al.

(10) Patent No.: US 11,218,963 B2
(45) Date of Patent: Jan. 4, 2022

(54) DISCONTINUOUS RECEPTION WAKEUP OPERATION WITH MULTIPLE COMPONENT CARRIERS

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/592,651

(22) Filed: Oct. 3, 2019

(65) Prior Publication Data

US 2020/0112919 A1    Apr. 9, 2020

Related U.S. Application Data

(60) Provisional application No. 62/742,240, filed on Oct. 5, 2018.

(51) Int. Cl.
*H04W 52/02* (2009.01)
*H04W 76/28* (2018.01)
(Continued)

(52) U.S. Cl.
CPC .......... *H04W 52/0229* (2013.01); *H04B 7/01* (2013.01); *H04B 7/0617* (2013.01);
(Continued)

(58) Field of Classification Search
CPC . H04W 52/0229; H04W 76/28; H04W 24/08; H04W 16/28; H04W 72/0466;
(Continued)

(56) References Cited

U.S. PATENT DOCUMENTS

2010/0238873 A1* 9/2010 Asanuma .......... H04W 72/0453
                                              370/329
2013/0223252 A1* 8/2013 Perets .................. H04L 1/0045
                                              370/252

(Continued)

FOREIGN PATENT DOCUMENTS

WO    WO-2010078365 A1    7/2010

OTHER PUBLICATIONS

International Search Report and Written Opinion—PCT/US2019/054711—ISA/EPO—dated Jan. 20, 2020.

(Continued)

*Primary Examiner* — Harry H Kim
(74) *Attorney, Agent, or Firm* — Holland & Hart LLP

(57) ABSTRACT

Methods, systems, and devices for wireless communications are described. A user equipment (UE) may operate in a discontinuous reception mode, receive configuration signaling configuring the UE with a quantity of carrier aggregation wakeup configurations, as well as receive, while operating in a discontinuous reception mode, a wakeup signal using at least one component carrier. The UE may identify a configuration indicator indicating a first carrier aggregation wakeup configuration of the quantity of carrier aggregation wakeup configurations based on the wakeup signal, and identify a second component carrier based on the first carrier aggregation wakeup configuration. Upon identifying the second component carrier, the UE may monitor a control channel of the second component carrier based on the first carrier aggregation wakeup configuration.

30 Claims, 27 Drawing Sheets

(51) Int. Cl.
    *H04W 24/08*     (2009.01)
    *H04W 16/28*     (2009.01)
    *H04W 72/04*     (2009.01)
    *H04B 7/06*     (2006.01)
    *H04L 5/00*     (2006.01)
    *H04B 7/01*     (2006.01)
    *H04W 68/02*     (2009.01)

(52) U.S. Cl.
    CPC ............ *H04L 5/001* (2013.01); *H04L 5/0092* (2013.01); *H04W 16/28* (2013.01); *H04W 24/08* (2013.01); *H04W 72/0466* (2013.01); *H04W 76/28* (2018.02)

(58) Field of Classification Search
    CPC ............ H04W 68/025; H04W 52/0216; H04B 7/0617; H04B 7/01; H04B 7/0695; Y02D 30/70; H04L 5/0098; H04L 5/0092; H04L 5/001; H04L 5/0053
    See application file for complete search history.

(56) References Cited

U.S. PATENT DOCUMENTS

| | | | | |
|---|---|---|---|---|
| 2013/0252622 | A1* | 9/2013 | Kobayashi | H04L 5/006 455/450 |
| 2015/0326356 | A1* | 11/2015 | Guan | H04L 5/005 370/330 |
| 2016/0323075 | A1* | 11/2016 | Jeong | H04L 5/0023 |
| 2019/0254110 | A1* | 8/2019 | He | H04L 5/0048 |
| 2019/0349046 | A1* | 11/2019 | Liu | H04B 17/336 |
| 2020/0029238 | A1* | 1/2020 | Si | H04L 5/10 |
| 2020/0092814 | A1* | 3/2020 | Zhou | H04W 80/02 |
| 2020/0187161 | A1* | 6/2020 | Wu | H04L 27/2666 |
| 2020/0259531 | A1* | 8/2020 | Zhu | H04B 7/0617 |
| 2020/0359322 | A1 | 11/2020 | Hwang et al. | |

OTHER PUBLICATIONS

Qualcomm Incorporated: "Detailed Design for WUS Signal Design", 3GPP Draft; R1-1804920_WUS Sequence, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018 Apr. 15, 2018, XP051427183, Retrieved from the Internet: URL:http://www.3gpp.org/ftp/Meetings%5F3GPP%5FSYNC/RAN1/Docs/ [retrieved on Apr. 15, 2018], Section 3.1, par. 2, Section 3.2, par. 1, Section 4, par. 1, first point "Problem 1 . . . ", first two sub-points, 17 pages.

VIVO: "Remaining Details on NR Paging Design", 3GPP Draft; R1-1719759_Remaining Details on NR Paging Design, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2018 Nov. 18, 2017, XP051369502, Retrieved from the Internet: URL:http://www.3gpp.org/ftp/tsg%5Fran/WG1%5FRL1/TSGR1%5F91/Docs/ [retrieved on Nov. 18, 2017], Section 2.1, par. 1-6 above "Proposal 2 . . . ", Section 2.3, par. above Fig. 1, par. below, Fig. 1.

* cited by examiner

Communication Beam(s) 205   Signaling 210

DISCONTINUOUS RECEPTION WAKEUP OPERATION WITH MULTIPLE COMPONENT CARRIERS

CROSS REFERENCE

The present application for patent claims the benefit of U.S. Provisional Patent Application No. 62/742,240 by NAM et al., entitled "DISCONTINUOUS RECEPTION WAKEUP OPERATION WITH MULTIPLE COMPONENT CARRIERS," filed Oct. 5, 2018, assigned to the assignee hereof, and expressly incorporated herein.

BACKGROUND

The following relates generally to wireless communications, and more specifically to discontinuous reception wakeup operation with multiple component carriers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

A UE may operate in a discontinuous reception (DRX) mode (e.g., a connected DRX (C-DRX) mode) where the UE transitions between an active state (e.g., where the UE wakes up to determine if data is available for the UE) and a sleep state (e.g., where the UE shuts down various hardware/processes to conserve power). The UE may determine if data is available by monitoring a control channel, such as a physical downlink control channel (PDCCH). The PDCCH may carry or otherwise convey an indication that the base station has data ready to transmit to the UE. In some examples of wireless communications systems, a UE may support carrier aggregation, as well as operating in a discontinuous reception mode. In carrier aggregation, a base station and a UE may use multiple carriers to increase throughput. Some techniques for using carrier aggregation in a discontinuous reception mode are deficient.

SUMMARY

The described techniques relate to improved methods, systems, devices, and apparatuses that support discontinuous reception wakeup operation with multiple component carriers. A user equipment (UE) may support carrier aggregation to realize a greater bandwidth and higher throughput, as well as support a discontinuous reception mode operation to reduce power consumption. To attain benefits of both carrier aggregation and discontinuous reception mode operation, the UE may receive a wakeup signal. The wakeup signal may provide an indication to the UE on whether to remain in a certain state during the discontinuous reception mode operation; thereby providing improved power efficiency for the UE. The wakeup signal may carry additional information such as a carrier aggregation wakeup configuration, which may allow the UE to activate some secondary cells for higher throughput. In this case, the UE may avoid activating secondary cells on which transmission may not occur. Thereby, the UE conserves power consumption, reduces latency, and improves communication efficiency.

A method of wireless communications at a UE is described. The method may include receiving configuration signaling configuring the UE with a set of carrier aggregation wakeup configurations, receiving, while operating in a discontinuous reception mode, a wakeup signal using at least one component carrier, identifying a configuration indicator indicating a first carrier aggregation wakeup configuration of the set of carrier aggregation wakeup configurations based on the wakeup signal, identifying a second component carrier based on the first carrier aggregation wakeup configuration, and monitoring a control channel of the second component carrier based on the first carrier aggregation wakeup configuration.

An apparatus for wireless communications is described. The apparatus may include a processor, memory in electronic communication with the processor, and instructions stored in the memory. The instructions may be executable by the processor to cause the apparatus to receive configuration signaling configuring the apparatus with a set of carrier aggregation wakeup configurations, receive, while operating in a discontinuous reception mode, a wakeup signal using at least one component carrier, identify a configuration indicator indicating a first carrier aggregation wakeup configuration of the set of carrier aggregation wakeup configurations based on the wakeup signal, identify a second component carrier based on the first carrier aggregation wakeup configuration, and monitor a control channel of the second component carrier based on the first carrier aggregation wakeup configuration.

Another apparatus for wireless communications is described. The apparatus may include means for receiving configuration signaling configuring the apparatus with a set of carrier aggregation wakeup configurations, receiving, while operating in a discontinuous reception mode, a wakeup signal using at least one component carrier, identifying a configuration indicator indicating a first carrier aggregation wakeup configuration of the set of carrier aggregation wakeup configurations based on the wakeup signal, identifying a second component carrier based on the first carrier aggregation wakeup configuration, and monitoring a control channel of the second component carrier based on the first carrier aggregation wakeup configuration.

A non-transitory computer-readable medium storing code for wireless communications at a UE is described. The code may include instructions executable by a processor to receive configuration signaling configuring the UE with a set of carrier aggregation wakeup configurations, receive, while operating in a discontinuous reception mode, a wakeup signal using at least one component carrier, identify a configuration indicator indicating a first carrier aggregation wakeup configuration of the set of carrier aggregation wakeup configurations based on the wakeup signal, identify a second component carrier based on the first carrier aggregation wakeup configuration, and monitor a control channel of the second component carrier based on the first carrier aggregation wakeup configuration.

Some examples of the method, apparatuses, and non-transitory computer-readable medium described herein may further include operations, features, means, or instructions for indexing a table, based on the configuration indicator, for identifying at least one parameter of the first carrier aggregation wakeup configuration, where monitoring the wakeup signal resource further includes and monitoring the control channel of the second component carrier based on the at least one parameter.

In some examples of the method, apparatuses, and non-transitory computer-readable medium described herein, receiving the wakeup signal using the at least one component carrier further may include operations, features, means, or instructions for monitoring a defined bandwidth part of the at least one component carrier for the wakeup signal.

In some examples of the method, apparatuses, and non-transitory computer-readable medium described herein, the first carrier aggregation wakeup configuration indicates a duration of a monitoring state within a DRX cycle, and where monitoring the control channel of the second component carrier further may include operations, features, means, or instructions for monitoring, for the duration of the monitoring state, the control channel of the second component carrier.

In some examples of the method, apparatuses, and non-transitory computer-readable medium described herein, the first carrier aggregation wakeup configuration indicates a monitoring occasion periodicity for the second control channel, and where monitoring the second control channel of the second component carrier further may include operations, features, means, or instructions for monitoring, for the duration of the monitoring state, each monitoring occasion of the second control channel of the second component carrier based on the monitoring occasion periodicity.

In some examples of the method, apparatuses, and non-transitory computer-readable medium described herein, the first carrier aggregation wakeup configuration indicates a number of control channel monitoring candidates for the second control channel, where monitoring the second control channel of the second component carrier further may include operations, features, means, or instructions for monitoring, for the duration of the monitoring state, one or more control channel monitoring candidates of the second control channel based on the number of control channel monitoring candidates.

In some examples of the method, apparatuses, and non-transitory computer-readable medium described herein, receiving the wakeup signal using the at least one component carrier further may include operations, features, means, or instructions for monitoring, in accordance with a beam sweeping pattern, a set of beams that each include a beamformed transmission of the wakeup signal.

In some examples of the method, apparatuses, and non-transitory computer-readable medium described herein, identifying the configuration indicator further may include operations, features, means, or instructions for decoding the wakeup signal to obtain the configuration indicator.

In some examples of the method, apparatuses, and non-transitory computer-readable medium described herein, decoding the wakeup signal further may include operations, features, means, or instructions for channel decoding the wakeup signal to obtain the configuration indicator.

In some examples of the method, apparatuses, and non-transitory computer-readable medium described herein, the wakeup signal is encoded with a polar code.

In some examples of the method, apparatuses, and non-transitory computer-readable medium described herein, each carrier aggregation wakeup configuration of the set of carrier aggregation wakeup configurations corresponds to a respective decoding hypothesis of a set of different decoding hypotheses, and where identifying the configuration indicator further may include operations, features, means, or instructions for performing blind decoding of the wakeup signal using at least one of the set of different decoding hypotheses to obtain a bit sequence that passes error detection and identifying the configuration indicator from a set of different configuration indicators that corresponds to a first decoding hypothesis of the set of different decoding hypotheses used to decode the bit sequence.

In some examples of the method, apparatuses, and non-transitory computer-readable medium described herein, identifying the configuration indicator further may include operations, features, means, or instructions for determining that a bit sequence decoded from the wakeup signal in accordance with a first resource element mapping pattern of a set of different resource element mapping patterns passes error detection and identifying the configuration indicator from a set of different configuration indicators based on the first resource element mapping pattern.

In some examples of the method, apparatuses, and non-transitory computer-readable medium described herein, a first resource element mapping pattern of the plurality of different resource element mapping patterns indicates a beam sweeping pattern.

In some examples of the method, apparatuses, and non-transitory computer-readable medium described herein, identifying the configuration indicator further may include operations, features, means, or instructions for decoding the wakeup signal to obtain a bit sequence, applying a set of scrambling sequences to the bit sequence to generate a set of scrambled bit sequences, determining a first scrambled bit sequence of the set of scrambled bit sequences passes error detection and identifying the configuration indicator from a set of different configuration indicators based on the first scrambled bit sequence.

In some examples of the method, apparatuses, and non-transitory computer-readable medium described herein, identifying the configuration indicator further may include operations, features, means, or instructions for decoding the wakeup signal to obtain a bit sequence, applying a set of root sequences to the bit sequence to generate a set of root bit sequences, determining a first root bit sequence of the set of root bit sequences passes error detection and identifying the configuration indicator from a set of different configuration indicators based on the first root bit sequence.

In some examples of the method, apparatuses, and non-transitory computer-readable medium described herein, identifying the configuration indicator further may include operations, features, means, or instructions for decoding the wakeup signal to obtain a set of bit sequences based on applying a set of respective phase shifts to the wakeup signal, determining a first bit sequence of the set of bit sequences passes error detection and identifying the configuration indicator from a set of different configuration indicators based on the first bit sequence.

In some examples of the method, apparatuses, and non-transitory computer-readable medium described herein, the first carrier aggregation wakeup configuration indicates an identifier of the second component carrier.

In some examples of the method, apparatuses, and non-transitory computer-readable medium described herein, the first carrier aggregation wakeup configuration indicates an identifier of the second component carrier and an identifier of at least one additional component carrier.

In some examples of the method, apparatuses, and non-transitory computer-readable medium described herein, the first carrier aggregation wakeup configuration indicates an identifier of at least one bandwidth part of the at least one component carrier, an identifier of at least one bandwidth part of the second component carrier, or both.

In some examples of the method, apparatuses, and non-transitory computer-readable medium described herein, the UE is operating in a discontinuous reception mode.

In some examples of the method, apparatuses, and non-transitory computer-readable medium described herein, each carrier aggregation wakeup configuration of the plurality of carrier aggregation wakeup configurations indicates at least one component carrier to activate subsequent to receiving the wakeup signal.

In some examples of the method, apparatuses, and non-transitory computer-readable medium described herein, each carrier aggregation wakeup configuration of the plurality of carrier aggregation wakeup configurations indicates at least one bandwidth part on at least one component carrier to activate subsequent to receiving the wakeup signal.

In some examples of the method, apparatuses, and non-transitory computer-readable medium described herein, the at least one component carrier includes the second component carrier.

A method of wireless communications at a base station is described. The method may include transmitting configuration signaling configuring a UE with a set of carrier aggregation wakeup configurations, transmitting, using at least one component carrier, a wakeup signal to indicate a first carrier aggregation wakeup configuration of a set of carrier aggregation wakeup configurations, and transmitting control information via a control channel of a second component carrier based on the first carrier aggregation wakeup configuration.

An apparatus for wireless communications is described. The apparatus may include a processor, memory in electronic communication with the processor, and instructions stored in the memory. The instructions may be executable by the processor to cause the apparatus to transmit configuration signaling configuring a UE with a set of carrier aggregation wakeup configurations, transmit, using at least one component carrier, a wakeup signal to indicate a first carrier aggregation wakeup configuration of a set of carrier aggregation wakeup configurations, and transmit control information via a control channel of a second component carrier based on the first carrier aggregation wakeup configuration.

Another apparatus for wireless communications is described. The apparatus may include means for transmitting configuration signaling configuring a UE with a set of carrier aggregation wakeup configurations, transmitting, using at least one component carrier, a wakeup signal to indicate a first carrier aggregation wakeup configuration of a set of carrier aggregation wakeup configurations, and transmitting control information via a control channel of a second component carrier based on the first carrier aggregation wakeup configuration.

A non-transitory computer-readable medium storing code for wireless communications is described. The code may include instructions executable by a processor to transmit configuration signaling configuring a UE with a set of carrier aggregation wakeup configurations, transmit, using at least one component carrier, a wakeup signal to indicate a first carrier aggregation wakeup configuration of a set of carrier aggregation wakeup configurations, and transmit control information via a control channel of a second component carrier based on the first carrier aggregation wakeup configuration.

In some examples of the method, apparatuses, and non-transitory computer-readable medium described herein, the configuration signaling indicates a configuration of a table that comprises at least one parameter for each carrier aggregation wakeup configuration of the plurality of carrier aggregation wakeup configurations.

In some examples of the method, apparatuses, and non-transitory computer-readable medium described herein, transmitting, using the at least one component carrier, the wakeup signal further may include operations, features, means, or instructions for transmitting the wakeup signal within a defined bandwidth part of the at least one component carrier.

In some examples of the method, apparatuses, and non-transitory computer-readable medium described herein, the first carrier aggregation wakeup configuration indicates a duration of a monitoring state within a DRX cycle, and where transmitting the control information via the control channel of the second component carrier further may include operations, features, means, or instructions for transmitting the control information via the control channel of the second component carrier based on the duration of the monitoring state.

In some examples of the method, apparatuses, and non-transitory computer-readable medium described herein, the first carrier aggregation wakeup configuration indicates a monitoring occasion periodicity for the second control channel, and where transmitting the control information via the second control channel of the second component carrier further may include operations, features, means, or instructions for transmitting the control information via the second control channel of the second component carrier based on each monitoring occasion of the second control channel.

In some examples of the method, apparatuses, and non-transitory computer-readable medium described herein, the first carrier aggregation wakeup configuration indicates a number of control channel monitoring candidates for the second control channel, where transmitting the control information via the second control channel of the second component carrier further may include operations, features, means, or instructions for transmitting the control information via the second control channel of the second component carrier within at least one of the control channel monitoring candidates of the second control channel.

In some examples of the method, apparatuses, and non-transitory computer-readable medium described herein, transmitting, using the at least one component carrier, the wakeup signal may further include operations, features, means, or instructions for transmitting, in accordance with a beam sweeping pattern, a set of beams that each include a beamformed transmission of the wakeup signal.

Some examples of the method, apparatuses, and non-transitory computer-readable medium described herein may further include operations, features, means, or instructions for channel encoding a configuration indicator to generate a channel encoded sequence and generating the wakeup signal based on the channel encoded sequence.

In some examples of the method, apparatuses, and non-transitory computer-readable medium described herein, channel encoding the configuration indicator further may include operations, features, means, or instructions for encoding the configuration indicator with a polar code to generate the channel encoded sequence.

In some examples of the method, apparatuses, and non-transitory computer-readable medium described herein, transmitting, using the at least one component carrier, the wakeup signal further may include operations, features, means, or instructions for transmitting the wakeup signal in accordance with a first resource element mapping pattern of a set of different resource element mapping patterns.

In some examples of the method, apparatuses, and non-transitory computer-readable medium described herein, transmitting, using the at least one component carrier, the wakeup signal further may include operations, features, means, or instructions for scrambling a bit sequence based on a first scrambling sequence of a set of scrambling sequences and generating the wakeup signal based on the scrambled bit sequence.

In some examples of the method, apparatuses, and non-transitory computer-readable medium described herein, transmitting, using the at least one component carrier, the wakeup signal further may include operations, features, means, or instructions for applying a first root sequence of a set of root sequences to a bit sequence to generate a root bit sequence and generating the wakeup signal based on the root bit sequence.

In some examples of the method, apparatuses, and non-transitory computer-readable medium described herein, transmitting, using the at least one component carrier, the wakeup signal further may include operations, features, means, or instructions for applying a first phase shift of a set of different phase shifts to the wakeup signal and transmitting the phase shifted wakeup signal.

In some examples of the method, apparatuses, and non-transitory computer-readable medium described herein, the first carrier aggregation wakeup configuration indicates an identifier of the second component carrier.

In some examples of the method, apparatuses, and non-transitory computer-readable medium described herein, the first carrier aggregation wakeup configuration indicates an identifier of the second component carrier and an identifier of at least one additional component carrier.

In some examples of the method, apparatuses, and non-transitory computer-readable medium described herein, the first carrier aggregation wakeup configuration indicates an identifier of at least one bandwidth part of the at least one component carrier, an identifier of at least one bandwidth part of the second component carrier, or both.

In some examples of the method, apparatuses, and non-transitory computer-readable medium described herein, the UE is operating in a discontinuous reception mode.

In some examples of the method, apparatuses, and non-transitory computer-readable medium described herein, each carrier aggregation wakeup configuration of the plurality of carrier aggregation wakeup configurations indicates at least one component carrier to activate subsequent to receiving the wakeup signal.

In some examples of the method, apparatuses, and non-transitory computer-readable medium described herein, each carrier aggregation wakeup configuration of the plurality of carrier aggregation wakeup configurations indicates at least one bandwidth part on at least one component carrier to activate subsequent to receiving the wakeup signal.

DETAILED DESCRIPTION

Figure 1:
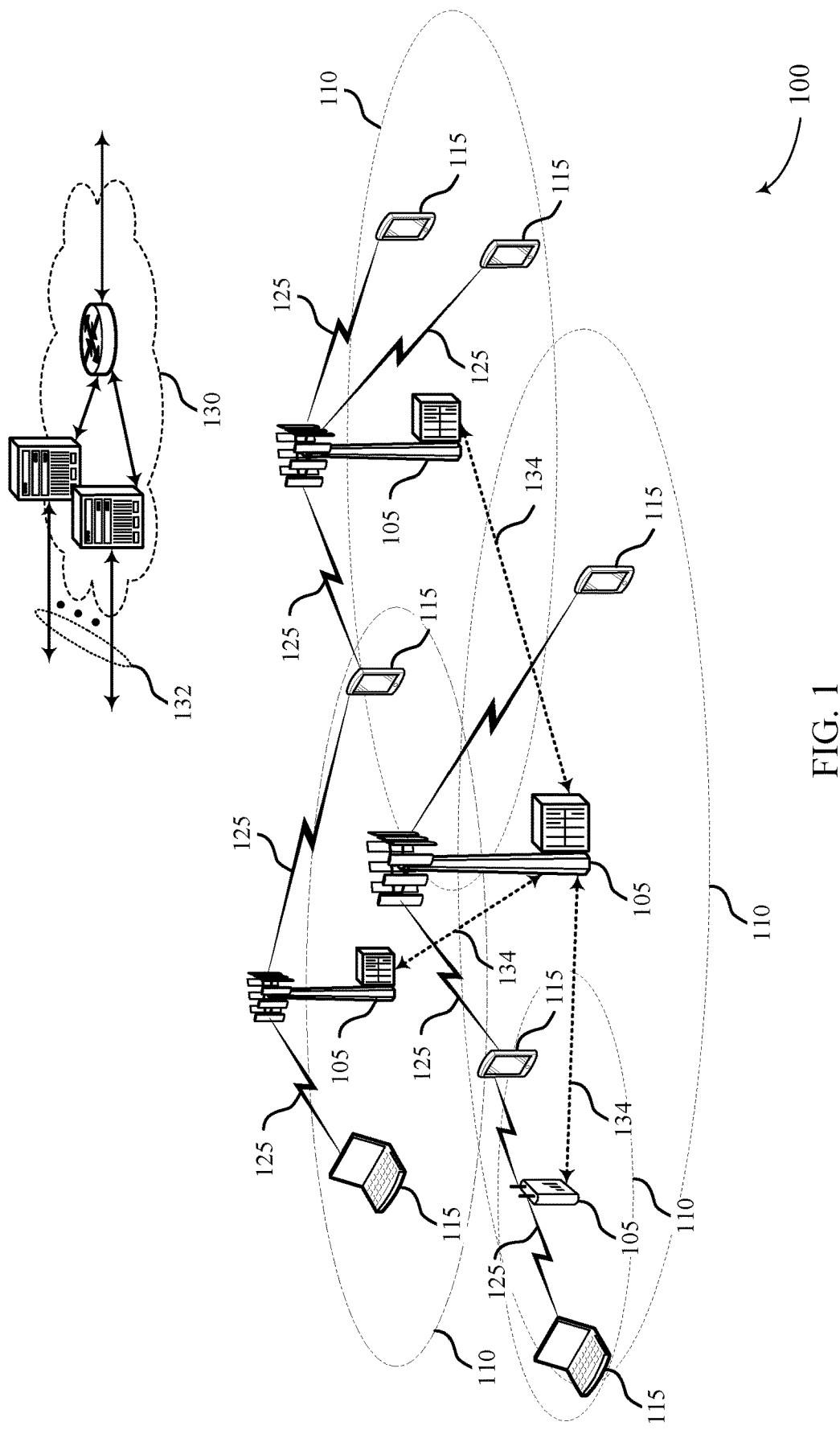
FIGS. 1 and 2 illustrate examples of a wireless communications system that supports discontinuous reception wakeup operation with multiple component carriers in accordance with aspects of the present disclosure.

The described techniques relate to improved methods, systems, devices, and apparatuses that support discontinuous reception wakeup operation with multiple component carriers. A user equipment (UE) may support carrier aggregation to realize a greater bandwidth and higher throughput, as well as support a discontinuous reception mode operation to reduce power consumption. To attain benefits of both carrier aggregation and discontinuous reception mode operation, the UE may receive a wakeup signal. The wakeup signal may provide an indication to the UE on whether to remain in a certain state during the discontinuous reception mode operation; thereby providing improved power efficiency for the UE. The wakeup signal may carry additional information such as a carrier aggregation wakeup configuration, which may allow the UE to activate some secondary cells for higher throughput. In this case, the UE may avoid activating secondary cells on which transmission may not occur. Thereby, the UE conserves power consumption, reduces latency, and improves communication efficiency.

A user equipment (UE) may support carrier aggregation and operate using multiple component carriers (e.g., up to five component carriers), to achieve a greater bandwidth and higher throughput. In some examples, the UE may additionally, or alternatively operate in a discontinuous reception mode to reduce power consumption. In the discontinuous reception mode, the UE may discontinuously monitor for transmissions from a base station (e.g., on a primary cell and/or on at least one secondary cell). To discontinuously monitor for transmissions, the UE may transition between a sleep state and an active state, also referred to herein as a monitoring state. The UE may transition into an active state periodically and monitor for transmissions from the base station, and when there are no transmissions in either direction (uplink or downlink) the UE may shift to a sleep state (e.g., where the UE shuts down various hardware/processes to conserve power).

In some cases, discontinuous reception mode with carrier aggregation may not be efficient since all component carriers are applied with a same discontinuous reception mode configuration. That is, because discontinuous reception mode operation and carrier aggregation may be orthogonal, the discontinuous reception mode configuration may be per UE, and not per component carrier. Therefore, when a UE is operating in a discontinuous reception mode, all configured and activated component carriers may be simultaneously awoken and transitioned to sleep. In addition, monitoring of a control channel (e.g., physical downlink control channel (PDCCH) monitoring) for whether data is available for the UE is performed simultaneously and independently for each component carrier. Following a timeout period or a reception of network command from the base station, secondary cells can be deactivated. This may result in a power penalty before the secondary cells are deactivated.

To achieve benefits of both carrier aggregation and discontinuous reception mode operation, the UE may receive a wakeup signal from the base station. The reception of the wakeup signal provides an indication to the UE on whether to remain in the active state or transition into the sleep state; thereby providing improved power efficiency for the UE when operating in a discontinuous reception mode. Additionally, the wakeup signal may carry additional information such as a carrier aggregation wakeup configuration, which may allow the UE to activate some secondary cells for higher throughput. In this case, the UE may avoid activating secondary cells on which transmission may not occur. Thereby, the UE conserves power consumption, reduces latency, and improves communication efficiency.

Aspects of the disclosure are initially described in the context of a wireless communications system. Aspects of the disclosure are then described in the context of a UE operating timeline, a power level timeline, a wakeup procedure timeline, and configurations that relate to discontinuous reception wakeup operation with multiple component carriers. Aspects of the disclosure are further illustrated by and described with reference to apparatus diagrams, system diagrams, and flowcharts that relate to discontinuous reception wakeup operation with multiple component carriers.

FIG. 1 illustrates an example of a wireless communications system 100 that supports discontinuous reception wakeup operation with multiple component carriers in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may additionally or alternatively operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may additionally or alternatively use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth. Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers. In some cases, wireless communications system 100 may utilize enhanced component carriers. An enhanced component carrier may be characterized by one or more features including wider carrier or frequency channel bandwidth, shorter symbol duration, shorter TTI duration, or modified control channel configuration. In some cases, an enhanced component carrier may be associated with a carrier aggregation configuration or a dual connectivity configuration (e.g., when multiple serving cells have a suboptimal or non-ideal backhaul link). An enhanced component carrier may also be configured for use in unlicensed spectrum or shared spectrum (e.g., where more than one operator is allowed to use the spectrum). An enhanced component carrier characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an enhanced component carrier may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing enhanced component carriers may transmit wideband signals (e.g., according to frequency channel or carrier bandwidths of 20, 40, 60, 80 MHz, etc.) at reduced symbol durations (e.g., 16.67 microseconds). A TTI in enhanced component carriers may include one or multiple symbol periods. In some cases, the TTI duration (that is, the number of symbol periods in a TTI) may be variable. Wireless communications systems such as an NR system may utilize any combination of licensed, shared, and unlicensed spectrum bands, among others. The flexibility of enhanced component carrier symbol duration and subcarrier spacing may allow for the use of enhanced component carrier across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples of wireless communications system 100, a UE 115 may support carrier aggregation and operate using multiple component carriers (e.g., up to five component carriers), to achieve a greater bandwidth and higher throughput. In some examples of the wireless communications system 100, a UE 115 may additionally, or alternatively operate in a discontinuous reception mode to reduce power consumption. In the discontinuous reception mode, a UE 115 may discontinuously monitor for transmissions from a base station 105 (e.g., on a primary cell and/or on at least one secondary cell). To discontinuously monitor for transmissions, a UE 115 may transition between a sleep state and an active state, also referred to herein as a monitoring state. A UE 115 may transition into an active state periodically and monitor for transmissions from a base station 105, and when there are no transmissions in either direction (uplink or downlink) the UE 115 may shift to a sleep state (e.g., where the UE 115 shuts down various hardware/processes to conserve power). In some examples, a UE 115 may receive, while operating in a discontinuous reception mode, a wakeup signal to signal a pending transmission (i.e., an available transmission) from a base station 105. The reception of the wakeup signal may provide an indication to a UE 115 on whether to remain in the active state or transition into the sleep state; thereby providing improved power efficiency for the UE 115 when operating in a discontinuous reception mode.

Some examples of wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from a base station 105 and/or a UE 115 may be beamformed. In a mmW wireless communication system, which relies on beamformed transmission and reception, a base station 105 (e.g., a next generation nodeB (gNB)) may need to beam sweep transmissions (e.g., beamformed communication beams carrying a wakeup signal). By beam sweeping the transmissions on m beamformed communication beams reduces the probability that a UE 115 misses the transmission due to beam degradation (e.g., misalignment, blocking, etc.).

Figure 2:
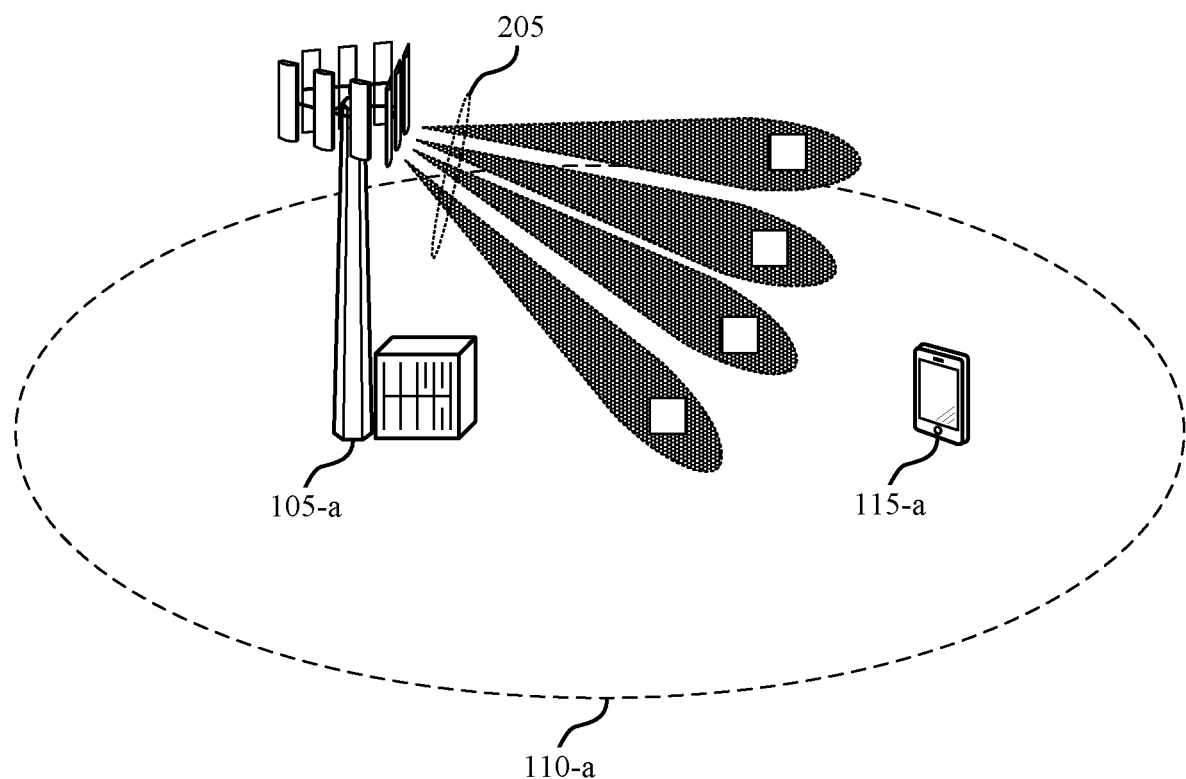

FIG. 2 illustrates an example of a wireless communications system 200 that supports discontinuous reception wakeup operation with multiple component carriers in accordance with aspects of the present disclosure. In some examples, the wireless communications system 200 may implement aspects of the wireless communications system 100. For example, the wireless communications system 200 may include a base station 105-a and a UE 115-a, which may be examples of the corresponding devices described with reference to FIG. 1. The base station 105-a may communicate with the UE 115-a within a coverage area 110-a.

The base station 105-a may perform a communication procedure (e.g., an RRC procedure, such as a cell acquisition procedure, random access procedure, RRC connection procedure, RRC configuration procedure) with the UE 115-a. The base station 105-a may be configured with multiple antennas, which may be used for directional or beamformed transmissions (e.g., beamformed communication beams 205). In some examples, the communication procedure may include a beam sweep procedure. As illustrated in FIG. 2, the base station 105-a may transmit a number of beamformed communication beams 205 in different directions within the coverage area 110-a.

As part of the communication procedure, the base station 105-a may transmit signaling 210 on one or more of the beamformed communication beams 205 to the UE 115-a. In some examples, the signaling 210 may include configuration signaling for configuring the UE 115-a with a set of carrier aggregation wakeup configurations. A carrier aggregation wakeup configuration may include one or more parameters such as, an identifier of a component carrier (e.g., to activate subsequent to receiving a wakeup signal), an identifier of at least one bandwidth part, a period of a monitoring state (e.g., an ON state of the UE 115-a) within a discontinuous reception cycle, a monitoring occasion periodicity, a number of control channel monitoring candidates, or a respective decoding hypothesis of a number of different decoding hypotheses, or a combination thereof.

The signaling 210 may additionally, or alternatively include a wakeup signal. For example, the UE 115-a may receive a wakeup signal (via signaling 210), while operating in a discontinuous reception mode, on at least one beamformed communication beam 205 using at least one component carrier. By beam sweeping the signaling 210 on $N_{Tx}$ communication beams 205 reduces the probability that the UE 115-a misses the signaling 210 due to beam degradation (e.g., misalignment, blocking, etc.). In some examples, a wakeup signal may be a reference signal (RS)-type (e.g., a channel state information RS (CSI-RS), a tracking RS (TRS), a demodulation RS (DMRS), etc.) or a control channel-type (e.g., a physical downlink control channel (PDCCH)-type), among others. The UE 115-a may identify a configuration indicator within the wakeup signal indicating a carrier aggregation wakeup configuration related to the set of carrier aggregation wakeup configurations.

The configuration indicator may be an n-bit indicator, where n is an integer value. For example, the configuration indicator may be a 2-bit indicator. In some examples, the set of carrier aggregation wakeup configurations may be indexed in a table, which may be stored locally on the UE 115-a. In this example, the UE 115-a may identify the carrier aggregation wakeup configuration by indexing the table using the n-bit indicator provided in the wakeup signal. That is, the n-bit indicator may relate to a specific carrier aggregation wakeup configuration in the table. By providing an n-bit indicator in the wakeup signal, and having the UE 115-a parse a table (e.g., a carrier aggregation wakeup configuration table) for additional information (i.e., a carrier aggregation wakeup configuration) reduces latency in the wireless communications system 200, as well as decreases higher signaling overhead. Following the identification of the carrier aggregation wakeup configuration, the UE 115-a may monitor a control channel (e.g., a PDCCH) on at least one component carrier according to the carrier aggregation wakeup configuration.

In some examples of the wireless communications system 200, to achieve a certain bandwidth and throughput, the UE 115-a may support carrier aggregation, where the UE 115-a may operate using multiple component carriers. Additionally, or alternatively, the UE 115-a may operate in a discontinuous reception mode, for example, such as a connected-discontinuous reception (C-DRX) mode to conserve energy, while improving the wireless communications system 200 performance. By providing a carrier aggregation wakeup configuration in a wakeup signal, the UE 115-a may experience benefits from both the carrier aggregation and discontinuous reception mode operations, as described herein.

Figure 3:
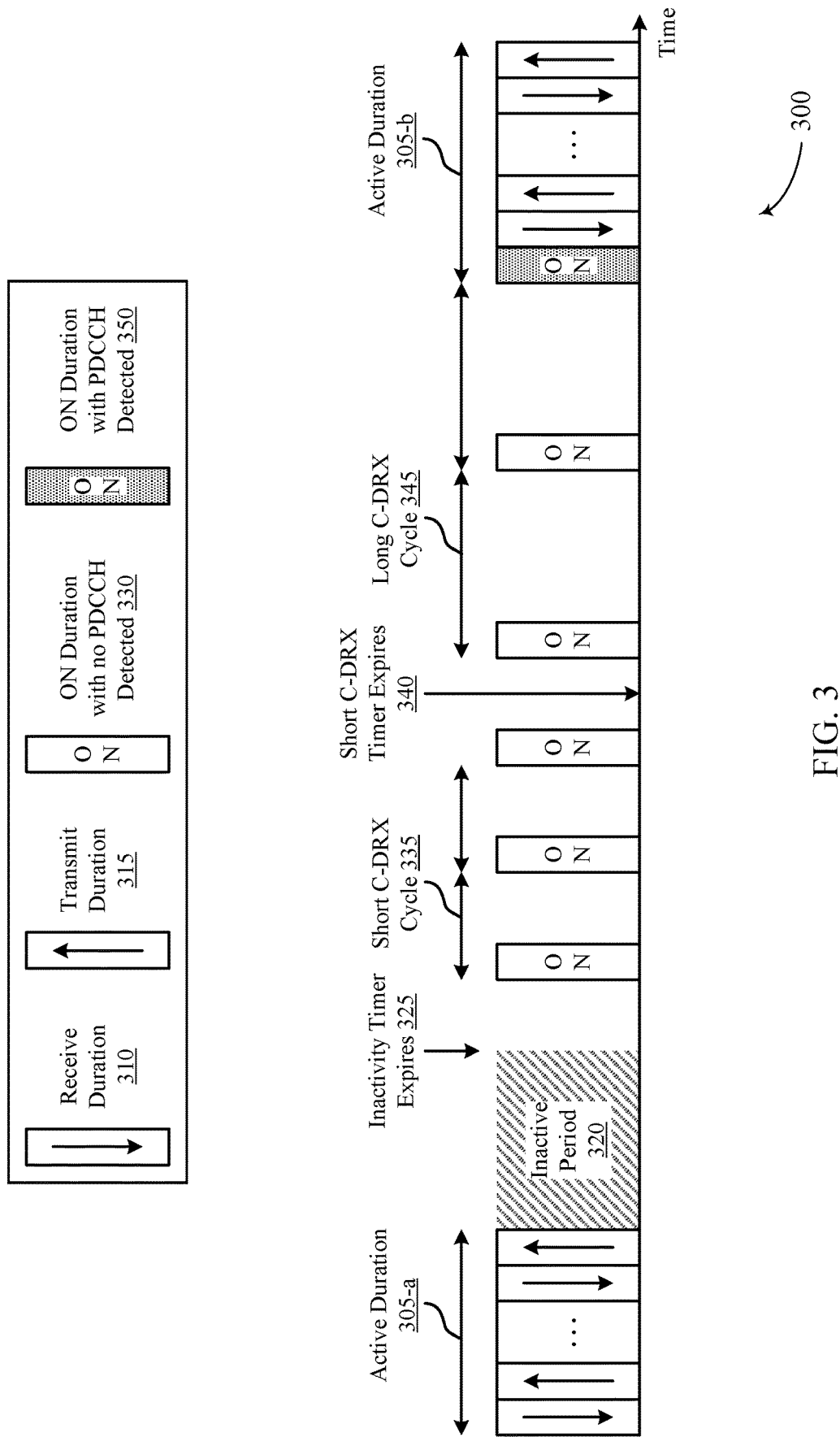
FIG. 3 illustrates an example of a user equipment (UE) operating timeline that supports discontinuous reception wakeup operation with multiple component carriers in accordance with aspects of the present disclosure.

FIG. 3 illustrates an example of a UE operating timeline 300 that supports discontinuous reception wakeup operation with multiple component carriers in accordance with aspects of the present disclosure. The UE operating timeline 300 may correspond to functionality performed by a UE 115 described with reference to FIGS. 1 and 2. A UE 115 may utilize C-DRX operations to achieve power savings during periods of traffic inactivity based on a capability or configuration of the UE 115. In some cases, the UE operating timeline 300 corresponds to UE 115 operations in a legacy wireless communications systems. For further power savings in a wireless communications system 100 or 200, a UE 115 may additionally support wakeup signals to trigger ramping-up power for UE "ON" durations.

A UE 115 may operate in a number of different power modes to support transmission and reception of data while achieving power savings. For example, in an active duration 305-a, a UE 115 may operate in a high or standard power mode (e.g., as compared to a low power mode or a sleep mode of the UE 115). During the active duration 305-a, the UE 115 may receive signals during any number of receive durations 310 and may transmit signals during any number of transmit durations 315. For example, the UE 115 may receive downlink data from a base station, transmit uplink data to the base station, participate in device-to-device (D2D) communications, or perform any combination of these operations.

The UE 115 may remain in the high or standard power mode for an inactive period 320 following the active duration 305-a. During this inactive period, the UE 115 may not detect any physical downlink control channel (PDCCH) signaling. The UE 115 may initiate an inactivity timer at the start of the inactive period 320 (i.e., the end of the active duration 305-a). If the UE 115 receives additional signals (e.g., PDCCH signals) or transmits additional signals before expiration of the inactivity timer, the UE 115 may re-enter an additional active duration 305 and may reset the inactivity timer to restart at the end of this additional active duration 305. Otherwise, if the inactivity timer expires at 325, the UE 115 may ramp-down its power and enter a low power mode or sleep mode (e.g., a UE "OFF" duration). During an OFF duration, the UE 115 may not transmit or receive signals due to the current UE power level. In this way, during traffic inactivity, the UE 115 may switch to C-DRX operation to achieve significant power savings.

Based on configured C-DRX cycles, the UE 115 may periodically or aperiodically wake up from the low power mode into an ON duration. During the ON duration, the UE 115 may monitor the PDCCH for any signaling transmitted to the UE 115. If the UE does not detect any PDCCH signaling for the UE 115, the UE 115 may return to an OFF duration (i.e., go back to sleep) for the remainder of the C-DRX cycle following the ON duration with no PDCCH detected 330. The UE 115 may then wake up for the next ON duration and repeat the PDCCH monitoring. The length of time between each ON duration may stay the same or change based on one or more timers. For example, the UE 115 may initially wake up from the OFF mode at regular intervals defined by a short C-DRX cycle 335. However, upon expiration of a short C-DRX timer at 340 (e.g., where the short C-DRX timer may be activated at the end of the inactive period 320), the UE 115 may switch from the short C-DRX cycle 335 to a long C-DRX cycle 345 for further power savings. During the long C-DRX cycles 345, the UE 115 may wake up periodically for ON durations, where the time intervals between ON durations for the long C-DRX cycles 345 are longer than the time intervals between ON durations during the short C-DRX cycles 335. In some cases, a UE 115 may support additional C-DRX cycle lengths and corresponding timers.

If, during an ON duration, the UE 115 detects a PDCCH signal for the UE 115, the UE 115 may perform a wakeup procedure and may terminate the C-DRX mode (e.g., either the short C-DRX mode or the long C-DRX mode). For example, the UE 115 may enter an active duration 305-*b* based on an ON duration with PDCCH detected 350. In some cases, the PDCCH signal may schedule data for the UE 115, and the UE 115 may operate according to a number of receive durations 310, transmit durations 315, or both during the active duration 305-*b* according to the data scheduling. The UE 115 may remain in the high or standard power mode for data transmission and reception during the active duration 305-*b*.

In some cases, the UE operating timeline 300 may be based on a number of configuration parameters for the UE 115. These configuration parameters may include an inactivity timer (e.g., a length of time for an inactive period 320, after which the UE 115 powers down), a short DRX timer (e.g., a length of time for operating according to a short C-DRX cycle 335 before switching to a long C-DRX cycle 345), a short DRX cycle (e.g., the length of the short C-DRX cycle 335 defining a first periodicity of ON durations), a long DRX cycle (e.g., the length of the long C-DRX cycle 345 defining a second periodicity of ON durations), or any combination of these or other relevant parameters for DRX operation. In some cases, the length of the ON durations may be configurable. In some cases, a UE 115 may be pre-configured with these configuration parameters. In other cases, a base station 105 may configure the UE 115 with configuration parameters. Additionally, the durations, periods, and cycles described herein may span any length of time (e.g., a number of symbols, slots, subframes, frames, etc.) based on the UE or base station configuration.

Figure 4:
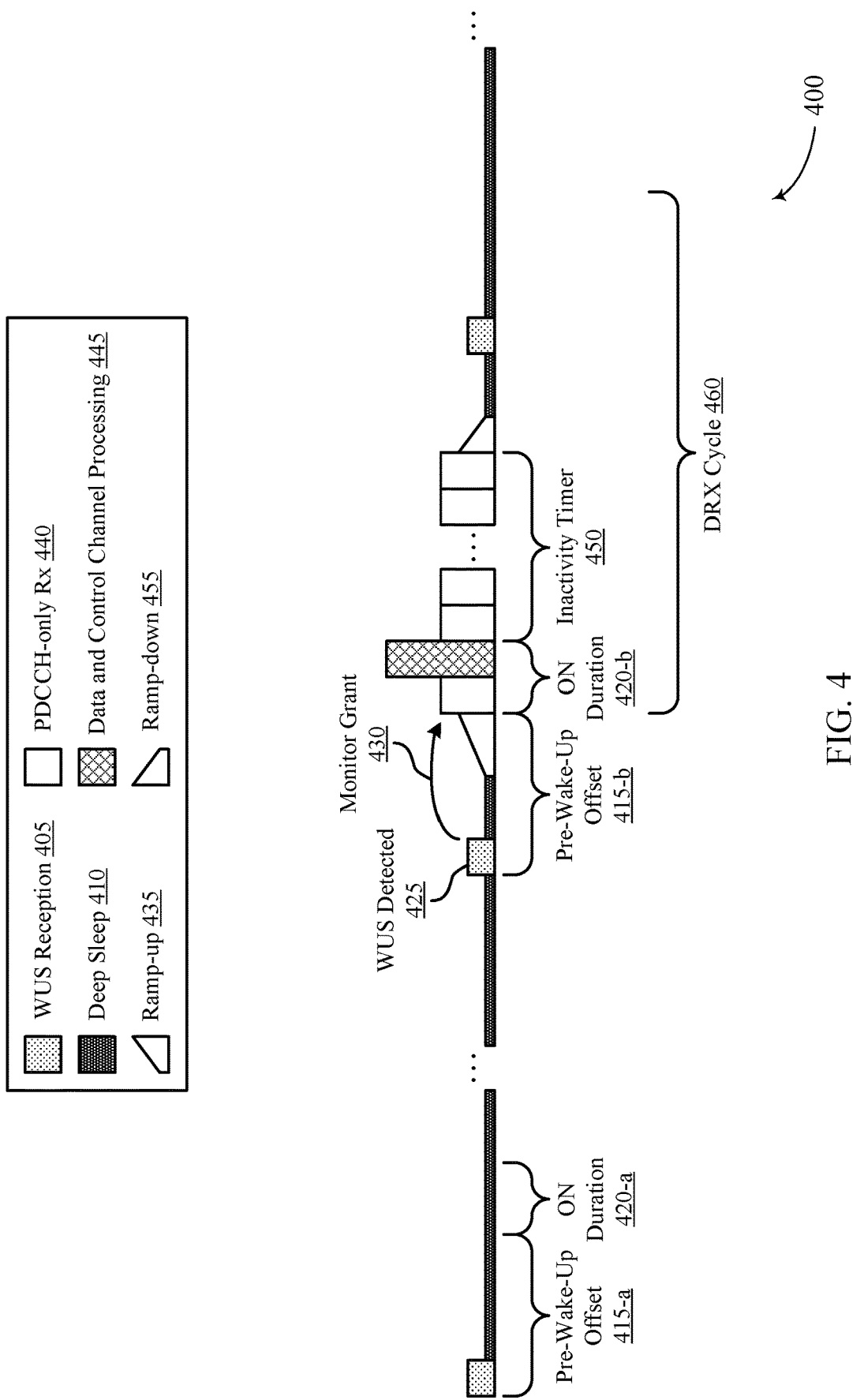
FIG. 4 illustrates an example of a power level timeline for a UE that supports discontinuous reception wakeup operation with multiple component carriers in accordance with aspects of the present disclosure.

FIG. 4 illustrates an example of a power level timeline 400 for a UE that supports discontinuous reception wakeup operation with multiple component carriers in accordance with aspects of the present disclosure. The power level timeline 400 may correspond to approximate or relative power levels for different modes of operation at a UE 115, such as a UE 115 described with reference to FIGS. 1 through 3. The UE 115 may support additional power savings by implementing extended sleep functionality (e.g., as compared to the UE operating timeline 300 illustrated in FIG. 3). By supporting wakeup procedures based on wakeup signaling that may be received at a lower power level than PDCCH signaling, the UE 115 may efficiently determine whether to wake up for data and control channel processing 445. As illustrated in FIG. 4, the height of each bar may indicate a relative power level for a UE 115 performing the corresponding operation, where a higher bar indicates a higher power level. For example, wakeup signal reception 405 may correspond to a slightly higher power level than a deep sleep 410 mode, but a lower power level than PDCCH-only reception 440 or data and control channel processing 445.

A UE 115 may turn on a wakeup subsystem for wakeup signal decoding while in a low power mode. This wakeup subsystem may be an example of a low complexity receiver, such as a simple correlator. As such, the wakeup subsystem may detect wakeup signals using a lower power than a receiver performing PDCCH decoding. In some cases, a wakeup signal may be a special type of waveform, such as an on-off keying (OOK) based tone, a preamble, a reference signal, etc. The UE 115 may perform wakeup signal reception 405 prior to a C-DRX ON duration 420. A pre-wakeup offset 415 may define a buffer period between the wakeup signal reception 405 and the ON duration 420 (e.g., for the UE 115 to process any received wakeup signal and perform a power ramp-up procedure 435). If the UE 115 does not detect a wakeup signal during wakeup signal reception 405 (e.g., if there is no downlink grant transmitted for the UE 115 at wakeup signal reception 405-*a* during the pre-wakeup offset 415-*a*), the UE 115 may skip an ON duration 420 (e.g., ON duration 420-*a*) and instead return to a deep sleep 410 mode until a next wakeup signal reception 415 opportunity. This wakeup signal reception 405 supporting extended deep sleep 410 durations may save power at the UE 115 by reducing the amount of PDCCH monitoring.

In some cases, the UE 115 may detect a wakeup signal during wakeup signal reception. Based on this wakeup signal detection 425, the UE 115 may perform a power ramp-up procedure 435 (e.g., during a pre-wakeup offset 415-*b*). This power ramp-up procedure 435 may transition the UE 115 from a first power level (e.g., a power level associated with a deep sleep 410 mode) to a second power level (e.g., a power level associated with a PDCCH-only reception 440 mode). The UE 115 may monitor for a grant 430 in the PDCCH-only reception 440 mode during an ON duration 420-*b*. This grant may be an example of a PDCCH grant scheduling data transmission or reception for the UE 115, and the grant may be indicated by the detected wakeup signal. For example, a base station 105 may transmit a wakeup signal to the UE 115 to indicate that the base station 105 is scheduled to transmit a PDCCH grant to the UE 115 during a next ON duration 420-*b*. The UE 115 may utilize a full modem for PDCCH reception and decoding, rather than the wakeup subsystem. For example, the UE 115 may wake up for the ON duration 420-*b* and may monitor for the PDCCH grant 430 using the full modem at a power level greater than the power level used for wakeup signal reception 405.

Based on the received PDCCH grant 430, the UE 115 may determine a schedule for performing data and control channel processing 445, which may be performed at a different power level than the PDCCH-only reception 440. Following the data and control channel processing 445, the UE 115 may remain in an active mode and monitor for any further PDCCH signals. If the UE 115 does not receive a further PDCCH grant before an inactivity timer expires (e.g., the UE 115 is inactive for a threshold duration 450), the UE 115 may perform a power ramp-down procedure 455 to return to a deep sleep 410. The UE 115 may then periodically or aperiodically check for wakeup signals according to a DRX cycle 460. For example, wakeup signal reception 405 may occur near the end of a DRX cycle 460 such that the UE 115 may wake up for a next DRX cycle 40 if a wakeup signal is received.

Figure 5:
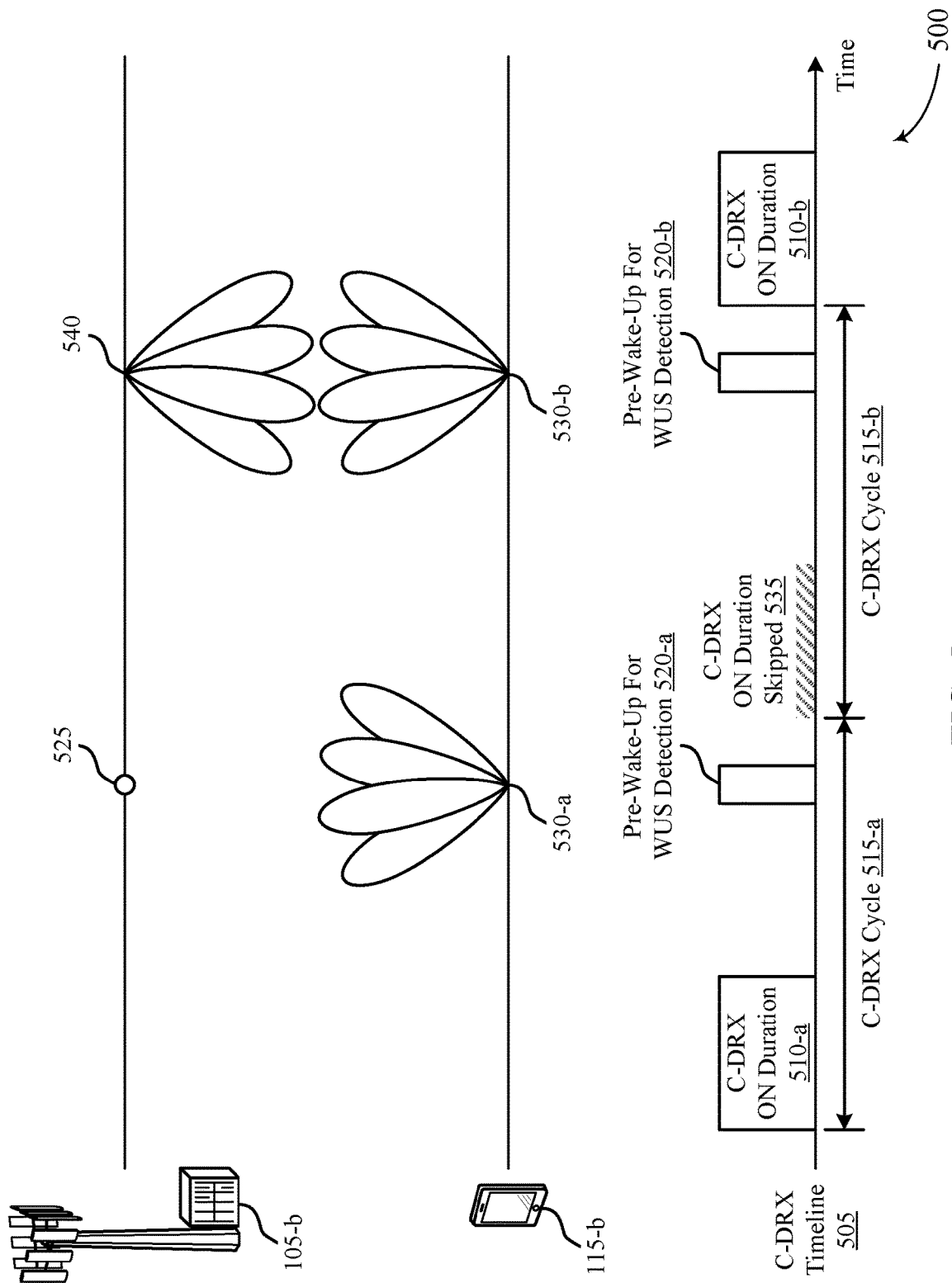
FIG. 5 illustrates an example of a wakeup procedure timeline for a wireless communications system that supports discontinuous reception wakeup operation with multiple component carriers in accordance with aspects of the present disclosure.

FIG. 5 illustrates an example of a wakeup procedure timeline 500 for a wireless communications system that supports discontinuous reception wakeup operation with multiple component carriers in accordance with aspects of the present disclosure. The wakeup procedure timeline 500 may correspond to wakeup signaling between base station 105-*b* and UE 115-*b*, which may be examples of the corresponding devices described with respect to FIGS. 1 through 4. Base station 105-*b* and UE 115-*b* may operate within a wireless communications system supporting beamforming, such as a mmW system. In some cases, UE 115-*b* may use a low power receiver for detecting wakeup signals transmitted by base station 105-*b*. Based on whether a wakeup signal is detected, UE 115-*b* may either return to a lower power mode (i.e., go back to sleep) or may transition to a higher power mode (i.e., wake up) to receive and/or transmit data.

A C-DRX timeline 505 illustrates the operations performed by UE 115-*b*. For example, during a first C-DRX ON duration 510-*a* corresponding to a first C-DRX cycle 515-*a*, 115-*b* may receive data from base station 105-*b*, transmit data to base station 105-*b*, perform other communication operations in an active mode, or any combination of these operations. Following the first C-DRX ON duration 510-*a*, UE 115-*b* may enter a low power mode (e.g., based on an inactivity timer). However, according to the C-DRX cycle 515 schedule, UE 115-*b* may periodically or aperiodically pre-wake up for wakeup signal detection 520-*a*. In some cases, a pre-wakeup procedure may involve UE 115-*b* transitioning to a higher power level than the sleep mode but a lower power level than the active mode to monitor for wakeup signals from base station 105-*b*.

In a first example, base station 105-*b* may not have data to transmit to UE 115-*b* or receive from UE 115-*b*. In this example, at 525, base station 105-*b* may not transmit a wakeup signal to UE 115-*b*. In some cases, base station 105-*b* may instead transmit one or more wakeup signals to other UEs 115 serviced by the base station 105-*b*. UE 115-*b* may monitor for wakeup signals using a set of downlink receive beams 530-*a*. If UE 115-*b* does not detect or otherwise receive a wakeup signal intended for UE 115-*b* on any of the downlink receive beams 530-*a*, the UE 115-*b* may skip a C-DRX ON duration at 535 for a C-DRX cycle 515-*b* and instead may return to the lower power mode (i.e., go back to sleep). In this way, UE 115-*b* may reduce its power consumption by not entering a C-DRX ON duration 510 when there is no data scheduled for reception or transmission.

In another example, base station 105-*b* may identify data to transmit to UE 115-*b* or data to receive from UE 115-*b*. In this example, at 540, base station 105-*b* may transmit a wakeup signal to UE 115-*b* using a beam sweeping procedure (e.g., transmitting the wakeup signal using a number of downlink transmit beams). UE 115-*b* may pre-wake up for wakeup signal detection 520-*b* during C-DRX cycle 515-*b* and may attempt to detect the wakeup signal using a set of downlink receive beams 530-*b*, which may be the same or different from the set of downlink receive beams 530-*a*. If UE 115-*b* detects the wakeup signal on any of these downlink receive beams 530-*b*, the UE 115-*b* may perform a full wakeup procedure to transmit or receive the scheduled data in a C-DRX ON duration 510-*b*.

The downlink transmit beams, the downlink receive beams, or both may be configured for improved detection at UE 115-*b*. For example, base station 105-*b* may use a set of $N_{Tx}$ beams (e.g., out of up to sixty-four synchronization signal block (SSB) beams) for wakeup signal transmission and UE 115-*b* may use a set of $N_{Rx}$ beams (e.g., out of up to sixty-four SSB beams) for wakeup signal reception. The numbers of beams, the directions of the beams, or both may be pre-configured for each wireless device or may be configured based on a configuration message or configuration function. For example, a configuration function for the beams may be based on a link quality, UE mobility, one or more UE capabilities, a C-DRX cycle 515 length, or some combination of these or other relevant parameters for wakeup signal reception. In some cases, the number and direction of downlink transmit beams, downlink receive beams, or both may be determined by base station 105-*b* for each UE 115 or group of UEs 115. Base station 105-*b* may use the determined number and direction of downlink transmit beams for a wakeup signal beam sweeping procedure. Additionally or alternatively, base station 105-*b* may transmit a configuration message to UE 115-*b* to indicate the determined number and direction of downlink receive beams for wakeup signal reception. In some cases, UE 115-*b* may not maintain beam information during OFF durations and may be pre-configured with default downlink receive beams to use during pre-wake up for wakeup signal detection 520.

Figure 6:
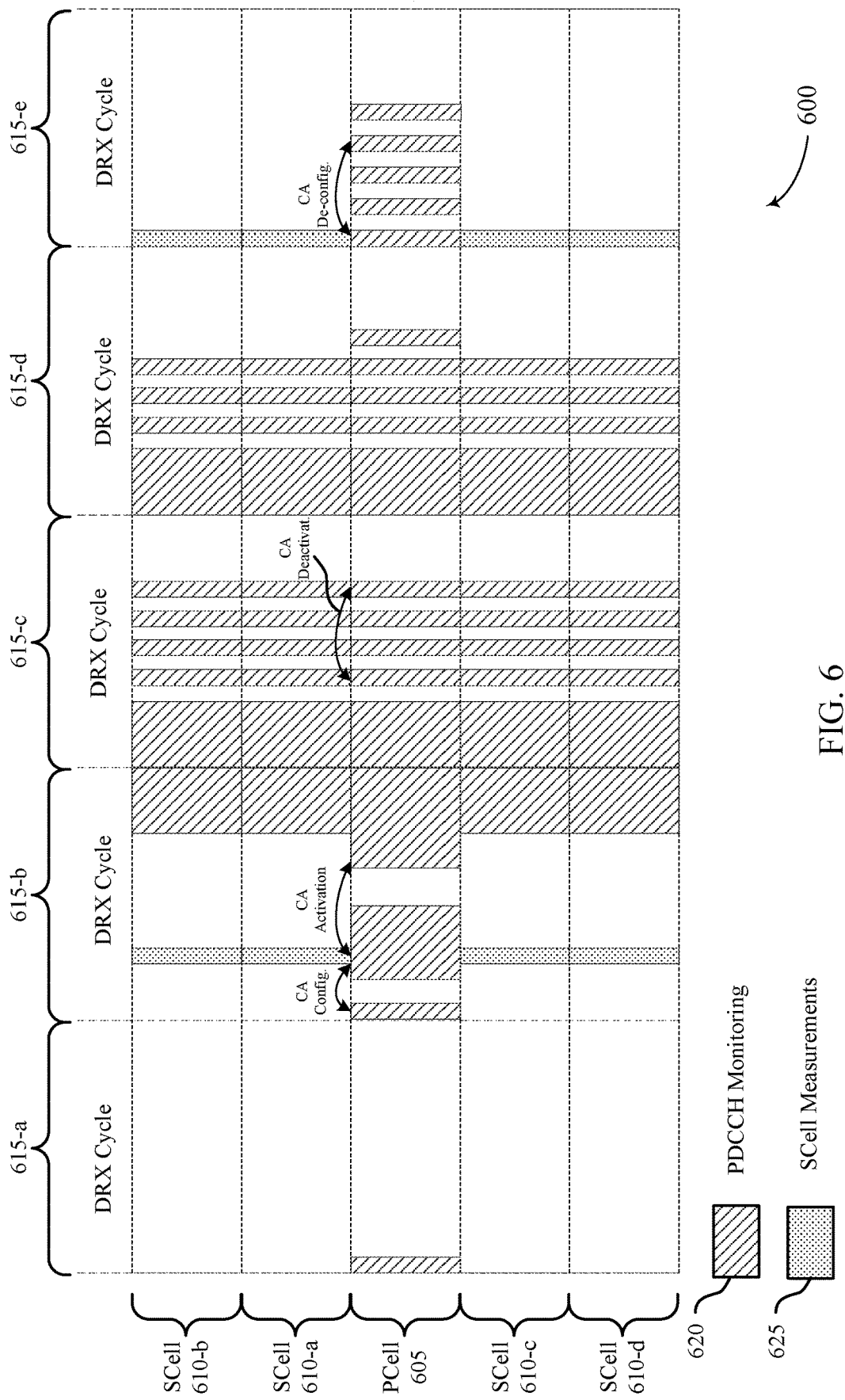
FIG. 6 illustrates an example of a configuration that supports connected-discontinuous reception (C-DRX) mode operation with carrier aggregation in accordance with aspects of the present disclosure.

FIG. 6 illustrates an example of a configuration 600 that supports C-DRX mode operation with carrier aggregation in accordance with aspects of the present disclosure. In some examples, the configuration 600 may implement aspects of the wireless communications systems 100 and 200. For example, a UE, which may be an example of the corresponding devices described with reference to FIGS. 1 through 5, may operate according to a C-DRX scheme with carrier aggregation, which may include a primary cell 605 component carrier and a set of secondary cell 610 component carriers, and across a set of DRX cycles 615. In some examples, one or more of the DRX cycles 615 may be a short C-DRX cycle or a long C-DRX cycle, as described herein.

As part of a traffic condition (e.g., traffic inactivity), a UE 115 may switch to a C-DRX mode operation for power saving. While in the C-DRX mode operation, the UE 115 may transition through one or more of the DRX cycles 615 and operate appropriately. For example, the UE 115 may transition between an active state and a sleep state throughout one or more of the DRX cycles 615. For example, the UE 115 may transition to an active state during a portion of the DRX cycle 615-*a*. While in the active state, the UE 115 may wakeup and monitor a control channel, for example, perform a PDCCH monitoring 620 for a period (e.g., an ON duration) of the DRX cycle 615-*a* on the primary cell 605 component carrier. In some cases, no beamformed transmissions may occur while the UE 115 is in the active state. In this case, the UE 115 may transition to a sleep state for a remainder of the DRX cycle 615-a.

In the DRX cycle 615-b, the UE 115 may again transition to an active state during a portion of the DRX cycle 615-b, and monitor a control channel (e.g., PDCCH). In this example, the UE 115 may receive a beamformed transmissions from a base station 105, for example, scheduling information for subsequent data transmissions. For example, the UE 115 may receive beamformed data transmissions from the base station 105 during a second portion of the DRX cycle 615-b. In some cases, if there is a change in traffic condition (e.g., increased traffic activity), the UE 115 may receive a carrier aggregation configuration message from the base station, and then perform secondary cell measurements 625. For example, the UE 115 may measure a channel condition associated with each of the secondary cells 610 component carriers (e.g., secondary cells 610-a through 610-d component carriers). Following the measurements of the secondary cells 610 component carriers, the UE 115 may receive a carrier aggregation activation command as part of monitoring the control channel during the second portion of the DRX cycle 615-b.

Upon reception of the carrier aggregation activation command, the UE 115 may expand its bandwidth coverage by activating the secondary cells 610 component carriers. As a result, the UE 115 may monitor control channels on the primary cell 605 component carrier, as well as on the secondary cells 610 component carriers. That is, once the secondary cells 610 component carriers are activated, the UE 115 may monitor PDCCH on the secondary cells 610 during the C-DRX ON durations. For example, the UE 115 may monitor control channels on the primary cell 605 component carrier, as well as on the secondary cells 610 component carriers for a remainder of the DRX cycle 615-b.

Within the DRX cycle 615-c, the UE 115 may continue to monitor control channels on the primary cell 605 component carrier, as well as on the secondary cells 610 component carriers. In the example of DRX cycle 615-c, an inactivity timer may expire and the UE 115 may transition into a sleep state for a remainder of the DRX cycle 615-c. As part of the DRX cycle 615-d, the UE 115 may again transition to an active state during a portion of the DRX cycle 615-d, and monitor control channels on the primary cell 605 component carrier, as well as on the secondary cells 610 component carriers. In an example, the UE 115 may receive a carrier aggregation deactivation command from the base station 105 while monitoring the primary cell 605 component carrier, as well as on the secondary cells 610 component carriers. The carrier aggregation deactivation command may instruct the UE 115 to deactivate the secondary cells 610 component carriers. For example, the base station 105 may transmit a carrier aggregation deactivation command to the UE 115 that may instruct the UE 115 to deactivate the secondary cells 610 due to another change in traffic conditions (e.g., decreased traffic activity).

Upon receiving the carrier aggregation deactivation command, the UE 115 may deactivate the secondary cells 610 component carriers during the DRX cycle 615-d. After the secondary cells 610 are deactivated, the UE 115 may monitor the PDCCH in the primary cell 605 during a remainder of the DRX cycle 615-d. In the DRX cycle 615-e, the UE 115 may continue to monitor a control channel (e.g., PDCCH) in the primary cell 605. In some cases, the UE 115 receive a carrier aggregation deconfiguration message and perform measurements on the secondary cells 610 component carriers.

As illustrated in FIG. 6, a UE 115 may activate its secondary cells component carriers. While activating its secondary cell component carriers may improve data throughput, there may be instances where no data transmission happens on a subset of the secondary cell component carriers. In this case there may be unnecessary power consumption by the UE 115 because the UE 115 is monitoring secondary cell component carriers where no data transmission will occur. Further, as shown in FIG. 6, carrier aggregation may be configured with a very short inactivity timer, for example, shorter than a C-DRX cycle. A secondary cell inactivity timer may expire and the secondary cell may be deactivated during a C-DRX OFF duration. Once the UE 115 is woken up for an ON duration, the base station 105 transmits the UE 115 an activation command for secondary cells. This results in undesirable latency and higher signaling overhead. Therefore, it may be desirable to improve facilitating activation and deactivation of secondary cells in accordance with aspects of the present disclosure.

Figure 7:
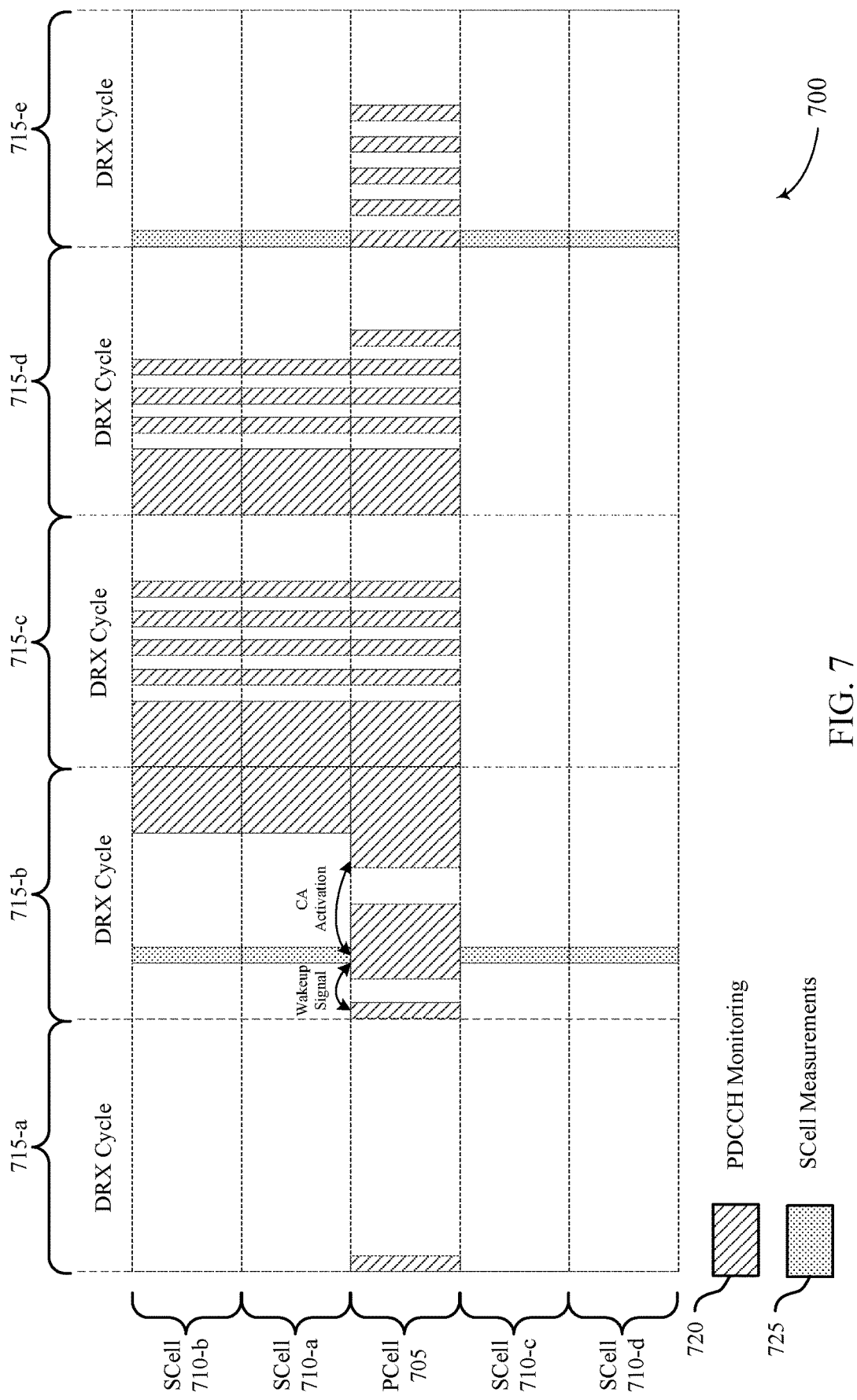
FIG. 7 illustrates an example of a configuration that supports discontinuous reception wakeup operation with multiple component carriers in accordance with aspects of the present disclosure.
Figure 8A:
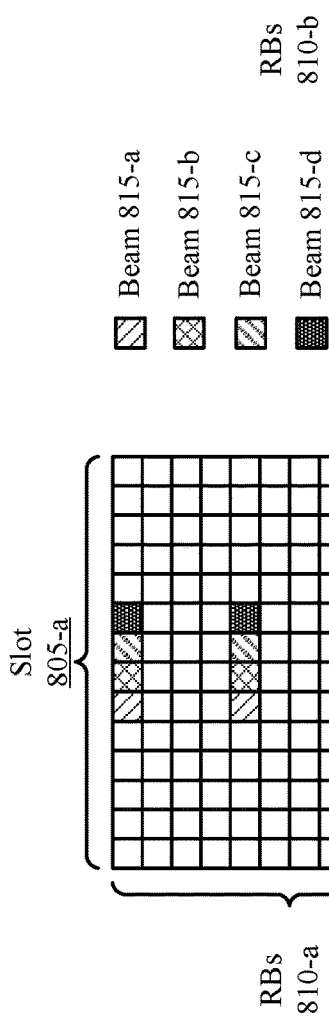
FIGS. 8A through 8D illustrate examples of a mapping pattern that supports discontinuous reception wakeup operation with multiple component carriers in accordance with aspects of the present disclosure.
Figure 8B:
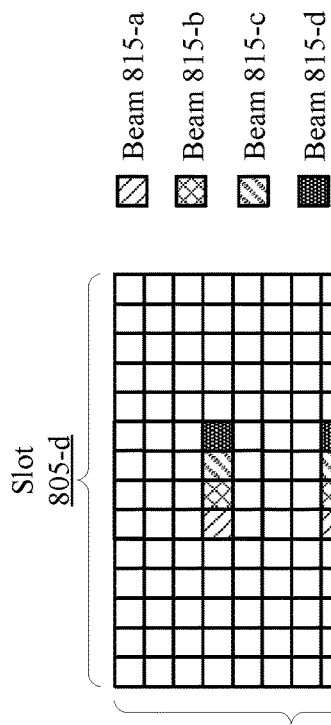
Figure 8C:
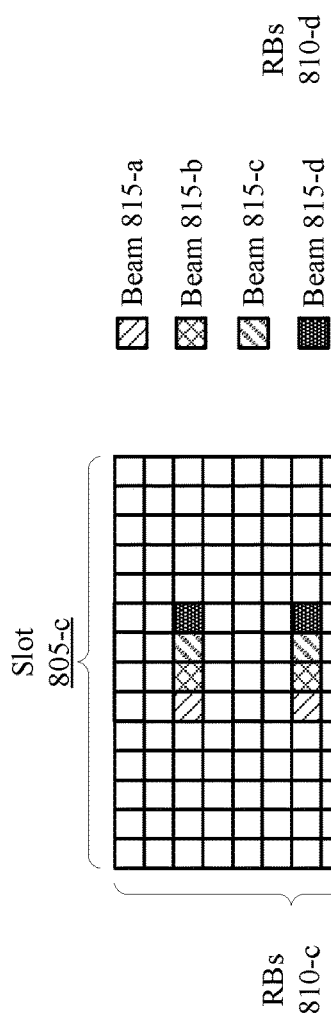
Figure 8D:
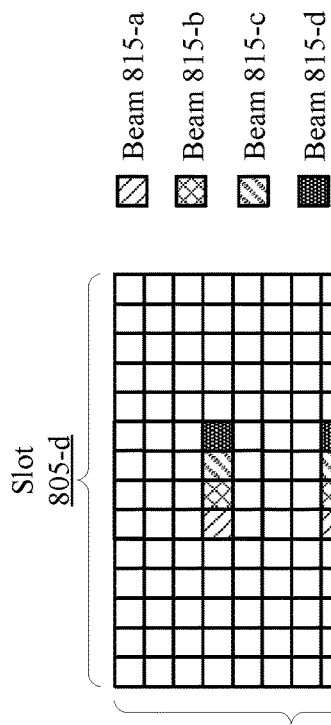

FIG. 7 illustrates an example of a configuration 700 that supports discontinuous reception wakeup operation with multiple component carriers in accordance with aspects of the present disclosure. A UE may support carrier aggregation for higher throughput and C-DRX mode operation for power saving. In some cases, carrier aggregation and C-DRX mode operation may be incompatible (i.e., not well harmonized). A wakeup signal may resolve the carrier aggregation and C-DRX schemes. In some examples, the configuration 700 may implement aspects of the wireless communications systems 100 and 200. For example, a UE or a base station, which may be examples of the corresponding devices described with reference to FIGS. 1 and 2, may operate according to a C-DRX scheme with carrier aggregation, which may include a primary cell 705 component carrier and a set of secondary cells 710 component carriers, and across a set of DRX cycles 715. In some examples, one or more of the DRX cycles 715 may be a short C-DRX cycle or a long C-DRX cycle.

As part of a traffic condition (e.g., traffic inactivity), a UE 115 may switch to a C-DRX mode operation for power saving. In the C-DRX mode operation, the UE 115 may transition through one or more of the DRX cycles 715 and operate appropriately. For example, a UE 115 may transition between an active state and a sleep state across one or more of the DRX cycles 715. In DRX cycle 715-a, a UE 115 may transition to an active state during a portion of the DRX cycle 715-a. While in the active state, the UE 115 may wakeup and monitor a control channel, for example, perform a PDCCH monitoring 720 for a period (e.g., an ON duration) on the primary cell 705 component carrier. During the active state, the UE 115 may monitor the control channel for any signaling transmitted to the UE 115. If the UE 115 does not detect any signaling for the UE115, the UE 115 may return to the sleep state (e.g., for an OFF duration) for a remainder of a DRX cycle following the period (i.e., ON duration) with no signaling detected for the UE 115. For example, no beamformed transmissions may occur while the UE 115 is in the active state during the portion of the DRX cycle 715-a. In this case, the UE 115 may transition to a sleep state for a remainder of the DRX cycle 715-a.

In the DRX cycle 715-b, the UE 115 may transition to an active state during a portion of the DRX cycle 715-b, and monitor a control channel (e.g., PDCCH). In this example, the UE 115 may receive a beamformed transmission, for example, carrying scheduling information for subsequent data transmissions. In some cases, the UE 115 may receive configuration signaling configuring the UE 115 with a quantity of carrier aggregation wakeup configurations. In some cases, the UE 115 may subsequently receive a wakeup signal that may carry wakeup information (e.g., carrier aggregation wakeup configurations).

The wakeup signal may be transmitted within one or a subset of component carriers and bandwidth parts, which may be configured for the UE 115. In an example, a wakeup signal may be transmitted within a default bandwidth part of a primary cell. That is, the UE 115 may receive a wakeup signal using at least one component carrier, for example, the primary cell 705 component carrier. The wakeup signal can deliver information for the UE 115 to perform a wakeup procedure. The information may include, identifiers of component carriers to wakeup according to traffic conditions. For example, in high traffic cases a large number of component carriers can be simultaneously awakened. In another example, the information may include identifiers of bandwidth parts to wake up. For example, a specific bandwidth part identifier in each component carrier may be awakened. In an example, secondary cell 710-a may include three bandwidth parts, and the wakeup signal may indicate to activate one or more of the three bandwidth parts. Additionally, or alternatively, the information may include a length of a monitoring state (e.g., length of an ON-duration). The information may in some cases include PDCCH monitoring parameters during a monitoring state (e.g., ON-duration) such as, PDCCH periodicity, number of PDCCH candidates, etc.

In some cases, the wakeup information may include an identifier for the wakeup configuration, such as a configuration indicator. The base station 105 may configure the UE 115 with a set of carrier aggregation wakeup configurations that are each associated with a respective configuration indicator, and the base station 105 may transmit a particular configuration indicator to indicate which carrier aggregation wakeup configuration the UE 115 is to apply. Each carrier aggregation wakeup configuration may include a set of parameters the UE 115 is to apply after receiving a wakeup signal that includes a corresponding configuration indicator. For example, each carrier aggregation wakeup configuration may indicate one or more component carriers, one or more bandwidth parts for each of the one or more indicated component carriers, a length of a monitoring state (e.g., ON-duration), or the like, or any combination thereof. The UE 115 may identify a configuration indicator indicating a carrier aggregation wakeup configuration based on the wakeup signal. In an example, the UE 115 may identify another component carrier based on the carrier aggregation wakeup configuration. For example, the other component carrier may include one or more of the secondary cells 710 component carriers.

The UE 115 may receive, within DRX cycle 715-b, a wakeup signal from the base station, and then perform secondary cell measurements 725. For example, the UE 115 may measure a channel condition associated with each of the secondary cells 710 component carriers (e.g., secondary cells 710-a through 710-d component carriers). The UE 115 may decode the configuration indicator from the wakeup signal and may index a table for determining a carrier aggregation wakeup configuration corresponding to the received configuration indicator. The UE 115 may determine which component carriers to activate and begin monitoring, as indicated in the carrier aggregation wakeup configuration, and begin monitoring of those one or more component carriers. For example, the UE 115 may begin monitoring the control channel of those component carriers during the second portion of the DRX cycle 715-b.

In the depicted example, the UE 115 may expand its bandwidth coverage by activating one or more of the secondary cells 710 component carriers in accordance with the indicated carrier aggregation wakeup configuration. In this example, the carrier aggregation wakeup configuration may indicate that the UE 115 is to activate the secondary cell 710-a component carrier and the secondary cell 710-b component carrier, but not, the secondary cell 710-c component carrier and the secondary cell 710-d component carrier. Activating a secondary cell component carrier may be in accordance with the carrier aggregation wakeup configuration. As a result, the UE 115 may monitor control channels on the primary cell 705 component carrier, as well as on the secondary cell 710-c component carrier and the secondary cell 710-d component carrier. In other examples, other carrier aggregation wakeup configurations may indicate to activate different combinations of the primary cell 705 component carrier and the secondary cell 710 component carriers. In some examples, a carrier aggregation wakeup configuration may indicate to activate one or more of the secondary cell 710 component carriers, and to deactivate the primary cell 705 component carrier. That is, once the appropriate primary cell 705 component carrier and/or secondary cell 710 component carriers are activated, the UE 115 monitors PDCCH in the primary cell 705 and/or one or more secondary cells 710 during the C-DRX ON durations in accordance with the indicated carrier aggregation wakeup configuration. The following discussion refers to the carrier aggregation wakeup configuration activating the primary cell 705 component carrier, the secondary cell 710-c component carrier, and the secondary cell 710-d component carrier.

The base station 105 may, for example, transmit a grant to the UE and may communicate data in accordance with the grant using one or more of the primary cell 705 component carrier, the secondary cell 710-c component carrier, and the secondary cell 710-d component carrier during DRX cycle 715-b and/or DRX cycle 715-c. In the DRX cycle 715-c, the UE 115 may continue to monitor control channels on the primary cell 605 component carrier, as well as on the secondary cell 710-a component carrier and the secondary cell 710-b component carriers.

The UE 115 may continue to communicate with the base station 105 on the primary cell 705 as well as on the secondary cell 710-a component carrier and the secondary cell 710-b component carriers. Subsequent to communicating, the UE 115 may, for example, detect communications inactivity and may enter a sleep state as described herein. In the example of DRX cycle 715-c, an inactivity timer may expire and the UE 115 may transition into a sleep state for a remainder of the DRX cycle 715-c. For instance, no transmissions may occur between the UE 115 and the base station 105 during a period associated with the inactivity timer. In this case, the UE 115 may transition into a sleep state to conserve power.

As part of the DRX cycle 715-d, the UE 115 may again transition to an active state during a portion of the DRX cycle 715-d, and monitor control channels on the primary cell 705 component carrier, as well as on the secondary cell 710-c component carrier and the secondary cell 710-d component carrier. In an example, the UE 115 may receive a carrier aggregation deactivation command from the base station while monitoring the primary cell 705 component carrier, as well as on the secondary cell 710-c component carrier and the secondary cell 710-*d* component carrier. The carrier aggregation deactivation command may instruct the UE 115 to deactivate the secondary cell 710-*c* component carrier and the secondary cell 710-*d* component carrier. For example, the base station may transmit a carrier aggregation deactivation command may to the UE 115 that may instruct the UE 115 to deactivate the secondary cells 610 due to another change in traffic conditions (e.g., decreased traffic activity).

Upon receiving the carrier aggregation deactivation command, the UE may deactivate the secondary cell 710-*c* component carrier and the secondary cell 710-*d* component carrier during the DRX cycle 715-*d*. After the corresponding secondary cells 710 are deactivated, the UE 115 may monitor the PDCCH in the primary cell 705 during a remainder of the DRX cycle 715-*d*. In the DRX cycle 715-*e*, the UE 115 may continue to monitor a control channel (e.g., PDCCH) in the primary cell 705. For example, the UE 115 may monitor for a wakeup signal carrying a configuration indicator, as described herein, to determine which component carriers to activate and begin monitoring, as indicated in the carrier aggregation wakeup configuration, and begin monitoring of those one or more component carriers. In some cases, the UE 115 receives a carrier aggregation deconfiguration message and perform measurements on the secondary cells 710 component carriers. The operations of FIG. 7 may also repeat one or more times. As illustrated in FIG. 7, a UE 115 may activate some secondary cell component carriers. By activating some secondary cell component carriers, the UE 115 may conserve power consumption, reduce latency, and improve communication efficiency.

FIG. 8A through 8D illustrate examples of a mapping pattern that supports discontinuous reception wakeup operation with multiple component carriers in accordance with aspects of the present disclosure. The mapping patterns illustrated in FIGS. 8A through 8D may implement aspects of wireless communications systems 100 and 200. For example, a first mapping pattern 800-*a* associated with FIG. 8A may correspond to a first carrier aggregation wakeup configuration, a second mapping pattern 800-*b* associated with FIG. 8B may correspond to a second carrier aggregation wakeup configuration, a third mapping pattern 800-*c* associated with FIG. 8C may correspond to a third carrier aggregation wakeup configuration, and a fourth mapping pattern 800-*d* associated with FIG. 8D may correspond to a fourth carrier aggregation wakeup configuration.

A base station 105, which may be examples of the corresponding devices described with respect to FIGS. 1 through 7, may encode wakeup information (e.g., configuration indicator) within a wakeup signal. The base station 105 may encode wakeup information according to one or more different techniques, and may transmit a wakeup signal that includes the encode wakeup information. For example, if a wakeup signal is PDCCH-type, the wakeup information can be channel coded (e.g., encode bits using a polar code) and modulated with quadrature phase shift keying (QPSK), in a manner in which the base station 105 may similarly modulate other types of PDCCH information. For example, the base station 105 may select a particular configuration indicator corresponding to a desired carrier aggregation wakeup configuration for the UE 115 to apply, and channel encode the configuration indicator to generate a channel encoded sequence. The base station 105 may generate the wakeup signal based on the channel encoded sequence for wireless transmission to the UE 115. In another example, the base station 105 may encode the configuration indicator with a polar code to generate the channel encoded sequence. If the base station 105 uses beam-sweeping to transmit a PDCCH-type wakeup signal, a same wakeup information may be contained in PDCCHs of the different beams. The UE 115 may detect the wakeup signal and perform polar decoding to retrieve the wakeup information (e.g., configuration indicator). Alternatively or additionally, if the wakeup signal is RS-type, the wakeup information can be encoded in a waveform.

The base station 105 may transmit the wakeup signal on a number of beamformed communication beams in a number of different symbol periods, in accordance with aspects of the present disclosure. The base station 105 may transmit a set of beamformed communication beams (e.g., beamformed communication beam 815-*a*, beamformed communication beam 815-*b*, beamformed communication beam 815-*c*, and beamformed communication beam 815-*d*) carrying a wakeup signal in accordance with a beam sweeping pattern. In some cases, the base station 105 may use different resource element mapping. For example, the base station 105 may use a 2-bit encoded indicator in the resource element mapping pattern and beam-sweep transmission of the wakeup signal to indicate different possible carrier aggregation wakeup configurations. For example, the base station 105 may transmit a wakeup signal using first mapping pattern 800-*a* to indicate a first configuration indicator, and hence that a UE 115 is to apply a first carrier aggregation configuration. Additionally or alternatively the base station 105 may transmit a wakeup signal using second mapping pattern 800-*b* to indicate a second configuration indicator, and hence that a UE 115 is to apply a second carrier aggregation configuration, and so forth.

The beam sweeping pattern may include transmitting each beam on some resource element of a resource block during a transmission time interval (e.g., a slot). For example, the base station 105 may transmit beamformed communication beam 815-*a*, beamformed communication beam 815-*b*, beamformed communication beam 815-*c*, and beamformed communication beam 815-*d* on some resource elements of the resource blocks 810-*a* during slot 805-*a* according to a first mapping pattern 800-*a* associated with FIG. 8A. The base station 105 may in some cases transmit beamformed communication beam 815-*a*, beamformed communication beam 815-*b*, beamformed communication beam 815-*c*, and beamformed communication beam 815-*d* on some resource elements of the resource blocks 810-*b* during slot 805-*b* according to a second mapping pattern 800-*b* associated with FIG. 8B. The base station 105 may transmit in some cases beamformed communication beam 815-*a*, beamformed communication beam 815-*b*, beamformed communication beam 815-*c*, and beamformed communication beam 815-*d* on some resource elements of the resource blocks 810-*a* during slot 805-*c* according to a third mapping pattern 800-*c* associated with FIG. 8C. The base station 105 may in some cases transmit beamformed communication beam 815-*a*, beamformed communication beam 815-*b*, beamformed communication beam 815-*c*, and beamformed communication beam 815-*d* on some resource elements of the resource blocks 810-*d* during slot 805-*d* according to a fourth mapping pattern 800-*d* associated with FIG. 8D.

The base station 105 may additionally, or alternatively use different scrambling sequences (e.g., different root, phase shift/rotation, etc.) to indicate which of the different possible carrier aggregation wakeup configurations the UE 115 is to apply. For example, the base station 105 may scramble a configuration indicator (or other wakeup information) to indicate which of the different possible carrier aggregation wakeup configurations the UE 115 is to apply. In this example, the base station 105 may select a particular scrambling sequence from a set of scrambling sequences that corresponds to a desired carrier aggregation wakeup configuration, and scramble the configuration indicator with the particular scrambling sequence. The base station 105 may similarly apply a root sequence to the configuration indicator, perform a phase shift/rotation to a wakeup signal, or the like, to indicate the desired carrier aggregation wakeup configuration. The UE 115 may perform an inverse operation to determine which of the different possible carrier aggregation wakeup configurations the UE 115 is to apply. For example, the UE 115 may decode a bit sequence from a receive wakeup signal, scramble the bit sequence with each of the scrambling sequences to identify which scrambled bit sequence passes error detection (e.g., a cyclic redundancy check). The UE 115 then identifies the configuration indicator corresponding to that scrambling sequence used to pass error detection and indexes a table with that configuration indicator to identifying the carrier aggregation wakeup configuration the UE 115 is to apply.

A UE 115, which may be examples of the corresponding devices described with respect to FIGS. 1 through 7, may decode wakeup information (e.g., configuration indicator) from a wakeup signal and identify a carrier aggregation wakeup configuration, in accordance with aspects of the present disclosure. The UE 115 may perform blind decoding on the resource elements for different hypothesis to retrieve the wakeup information (e.g., identifying the configuration indicator and determine the corresponding carrier aggregation wakeup configuration). For example, the UE 115 may perform blind decoding of a wakeup signal using at least one of a number of different decoding hypotheses (e.g., each decoding hypothesis corresponds to a respective one of the mapping patterns in FIGS. 8A-8D) to obtain a bit sequence that passes error detection, and identify a configuration indicator that corresponds to a first decoding hypothesis of a set of different decoding hypotheses used to successfully decode the bit sequence. The UE 115 then identifies the configuration indicator corresponding to that decoding hypothesis used to pass error detection and indexes a table with that configuration indicator to identifying the carrier aggregation wakeup configuration the UE 115 is to apply. Alternatively or additionally, in some cases, the UE 115 may determine that a bit sequence decoded from the wakeup signal in accordance with a first resource element mapping pattern of a set of different resource element mapping patterns passes error detection, and identify the configuration indicator based on the first resource element mapping pattern.

Figure 9:
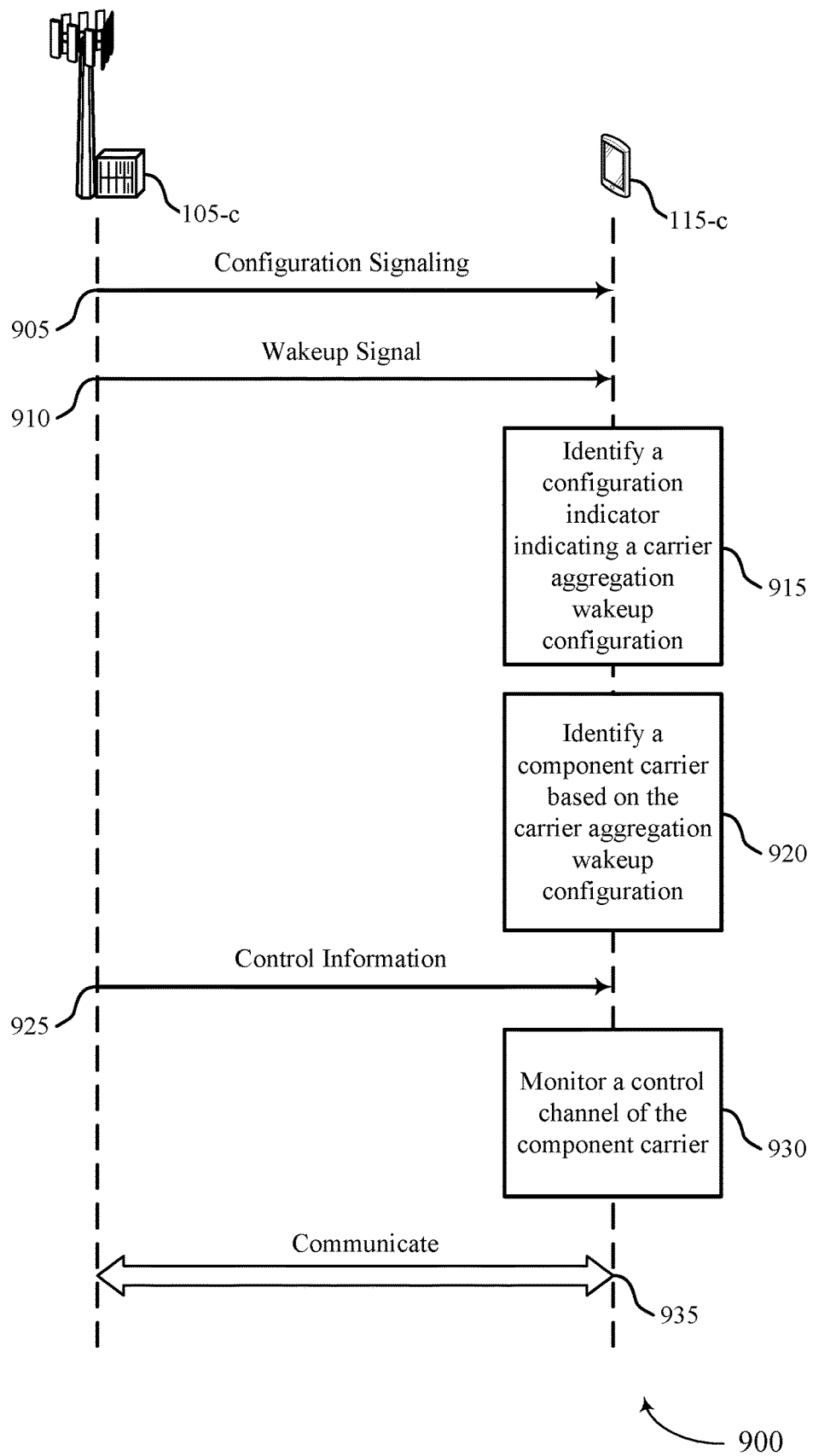
FIG. 9 illustrates an example of a process flow that supports discontinuous reception wakeup operation with multiple component carriers in accordance with aspects of the present disclosure.

FIG. 9 illustrates an example of a process flow 900 that supports discontinuous reception wakeup operation with multiple component carriers in accordance with aspects of the present disclosure. The process flow 900 may include a base station 105-c and a UE 115-c, which may be examples of the corresponding devices described with reference to FIGS. 1 through 8. In some examples, the process flow 900 may implement aspects of the wireless communications systems 100 and 200. For example, the base station 105-c and the UE 115-c, may support facilitating activation and deactivation of secondary cells.

In the following description of the process flow 900, the operations between the base station 105-c and the UE 115-c may be transmitted in a different order than the exemplary order shown, or the operations performed by the base station 105-c and the UE 115-c may be performed in different orders or at different times. Some operations may also be left out of the process flow 900, or other operations may be added to the process flow 900. The process flow 900 may, in some examples, commence with the base station 105-c establishing a connection with the UE 115-c (e.g., performing a cell acquisition procedure, a random access procedure, an RRC connection procedure, an RRC configuration procedure).

At 905, the base station 105-c may transmit configuration signaling to the UE 115-c. The configuration signaling may configure the UE 115-c with a set of carrier aggregation wakeup configurations. In some examples, the configuration signaling may indicate a configuration of a table that includes at least one parameter for each carrier aggregation wakeup configuration of the set of carrier aggregation wakeup configurations. A carrier aggregation wakeup configuration may indicate a duration of a monitoring state within a DRX cycle, a monitoring occasion periodicity for a control channel, a number of control channel monitoring candidates for a control channel, among others. For example, a carrier aggregation wakeup configuration may indicate an identifier of a secondary cell component carrier, which the UE 115-c may activate during high traffic activity (e.g., to activate subsequent to receiving a wakeup signal). In another example, a carrier aggregation wakeup configuration may indicate an identifier of at least one bandwidth part of the at least one component carrier (e.g., of a primary cell), an identifier of at least one bandwidth part of a second component carrier (e.g., of a secondary cell), or both.

At 910, the base station 105-c may transmit a wakeup signal to the UE 115-c. In some examples, the base station 105-c may transmit, using at least one component carrier (e.g., via a primary cell (PCell) and/or one or more secondary cells (SCells)), a wakeup signal to indicate a first carrier aggregation 725 wakeup configuration of a set of carrier aggregation wakeup configurations. The base station 105-c may, in some examples, transmit the wakeup signal within a defined bandwidth part of the at least one component carrier. In some examples, the base station 105-c may transmit, in accordance with a beam sweeping pattern, a number of beams that each include a beamformed transmission of the wakeup signal to reduce the probability of the UE 115-c missing the wakeup signal transmission. In some cases, the UE 115-c may monitor a defined bandwidth part of the at least one component carrier for the wakeup signal.

At 915, the UE 115-c may identify a configuration indicator indicating a carrier aggregation wakeup configuration. For example, the UE 115-c may identify the configuration indicator based on decoding the wakeup signal or channel decoding the wakeup signal to obtain the configuration indicator. In some examples, the wakeup signal may be encoded with a polar code. In some cases, the UE 115-c may index at table, based on the configuration indicator, for identifying at least one parameter of the carrier aggregation wakeup configuration before receiving the wakeup signal. For example, the UE 115-c may monitor a control channel of a component carrier based on the resource configuration parameter.

In some cases, each carrier aggregation wakeup configuration of the set may correspond to a respective decoding hypothesis of a number of different decoding hypotheses (e.g., e.g., each decoding hypothesis corresponds to a respective one of the mapping patterns in FIGS. 8A-8D). In this case, the UE 115-c may perform blind decoding of the wakeup signal using at least one of a number of different decoding hypotheses to obtain a bit sequence that passes error detection, and identify the configuration indicator that corresponds to a first decoding hypothesis of the number of different decoding hypotheses used to decode the bit sequence. In some cases, the UE 115-c may determine that a bit sequence decoded from the wakeup signal in accordance with a first resource element mapping pattern of a number of different resource element mapping patterns passes error detection, and identify the configuration indicator based on the first resource element mapping pattern. In some examples, a first resource element mapping pattern of the number of different resource element mapping patterns indicates a beam sweeping pattern.

The UE 115-c may additionally, or alternatively decode the wakeup signal to obtain a bit sequence, apply number of scrambling sequences to the bit sequence to generate a number of scrambled bit sequences, determine a first scrambled bit sequence of the number of scrambled bit sequences passes error detection, and identify the configuration indicator from a number of different configuration indicators based on the first scrambled bit sequence. The UE 115-c may in some cases, apply a number of root sequences to the bit sequence to generate a number of root bit sequences, determine a first root bit sequence of the number of root bit sequences passes error detection, and identify the configuration indicator from a number of different configuration indicators based on the first root bit sequence.

At 925, the base station 105-c may transmit control information to the UE 115-c. For example, the base station 105-c may transmit a downlink grant scheduling resources (e.g., time and frequency resource) for data beamformed transmissions to the UE 115-c. At 930, the UE 115-c may monitor a control channel of the component carrier. For example, the UE 115-c may monitor a control channel of a secondary cell component carrier based on the first carrier aggregation wakeup configuration. In some examples, the UE 115-c may monitor, for a duration of a monitoring state, the control channel of the of secondary cell component carrier. In some cases, the UE 115-c may monitor, for a duration of a monitoring state (e.g., duration of an ON state within a DRX cycle), each monitoring occasion of the control channel of the secondary cell component carrier based on the monitoring occasion periodicity. A monitoring occasion a control channel may refer to instances of when a control channel occurs within the duration of the monitoring state. In some cases, the UE 115-c may also monitor, for the duration of the monitoring state, one or more control channel monitoring candidates of the control channel based on the number of control channel monitoring candidates. A control channel monitoring candidate may correspond to time and/or frequency resources within a control channel the UE 115 may monitor for control information, such as, for example, downlink control information, a grant of resources for an uplink and/or downlink transmission, or the like. At 935, the base station 105-c and the UE 115-c may communicate with each according to the grant received within the control information received on the monitored control channel. Subsequent to communicating, the UE 115-c may, for example, detect communications activity and may enter a sleep state as described herein. The operations of FIG. 9 may also repeat one or more times.

Figure 10:
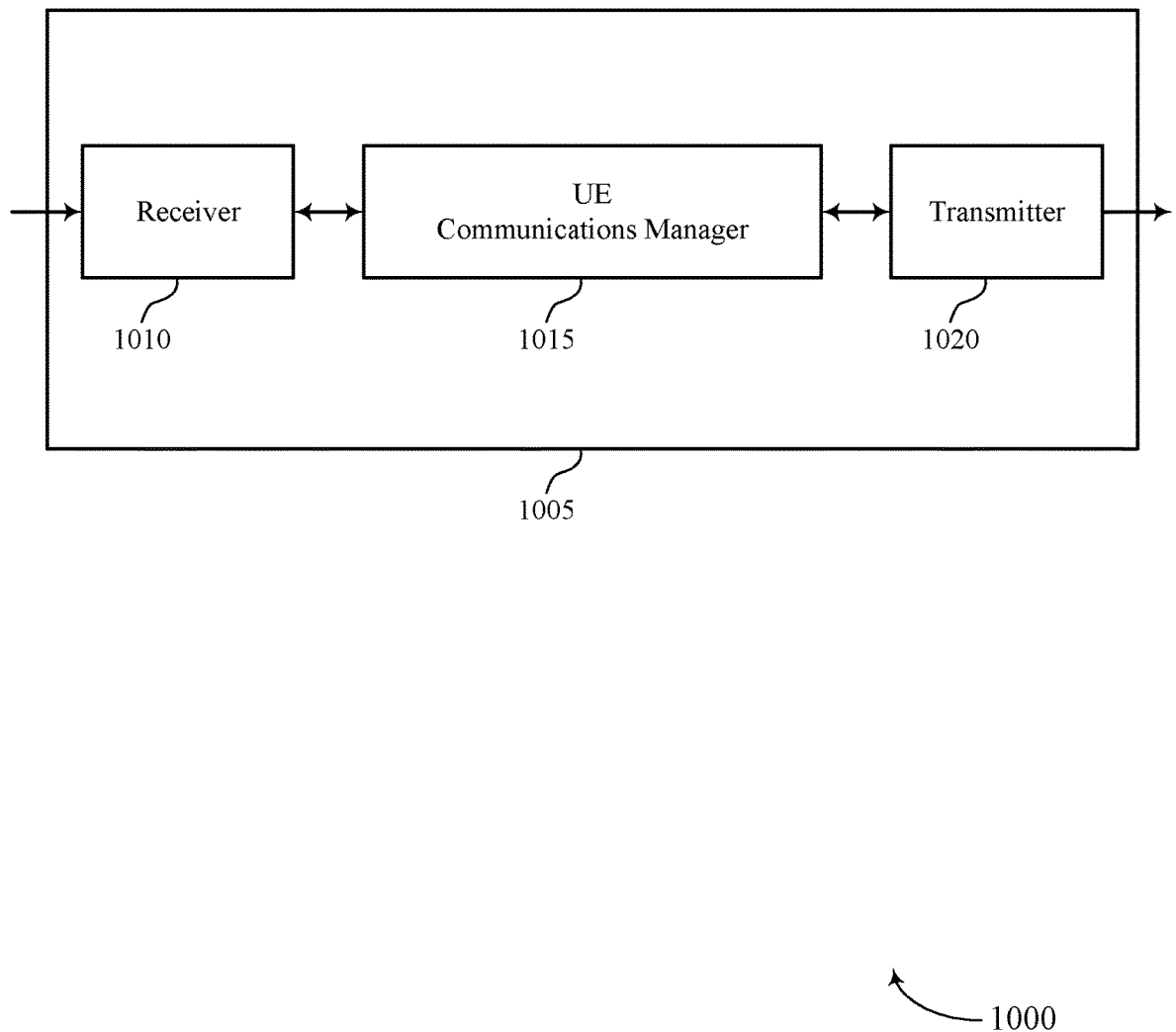
FIGS. 10 and 11 show block diagrams of devices that support discontinuous reception wakeup operation with multiple component carriers in accordance with aspects of the present disclosure.

FIG. 10 shows a block diagram 1000 of a device 1005 that supports discontinuous reception wakeup operation with multiple component carriers in accordance with aspects of the present disclosure. The device 1005 may be an example of aspects of a UE 115 as described herein. The device 1005 may include a receiver 1010, a UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to discontinuous reception wakeup operation with multiple component carriers, etc.). Information may be passed on to other components of the device 1005. The receiver 1010 may be an example of aspects of the transceiver 1320 described with reference to FIG. 13. The receiver 1010 may utilize a single antenna or a set of antennas.

The UE communications manager 1015 may receive configuration signaling configuring the UE with a set of carrier aggregation wakeup configurations, receive, while operating in a discontinuous reception mode, a wakeup signal using at least one component carrier, identify a configuration indicator indicating a first carrier aggregation wakeup configuration of the set of carrier aggregation wakeup configurations based on the wakeup signal, identify a second component carrier based on the first carrier aggregation wakeup configuration, and monitor a control channel of the second component carrier based on the first carrier aggregation wakeup configuration. The UE communications manager 1015 may be an example of aspects of the UE communications manager 1310 described herein.

The UE communications manager 1015, or its sub-components, may be implemented in hardware, code (e.g., software or firmware) executed by a processor, or any combination thereof. If implemented in code executed by a processor, the functions of the UE communications manager 1015, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1015, or its sub-components, may be physically located at various positions, including being distributed such that portions of functions are implemented at different physical locations by one or more physical components. In some examples, the UE communications manager 1015, or its sub-components, may be a separate and distinct component in accordance with various aspects of the present disclosure. In some examples, the UE communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
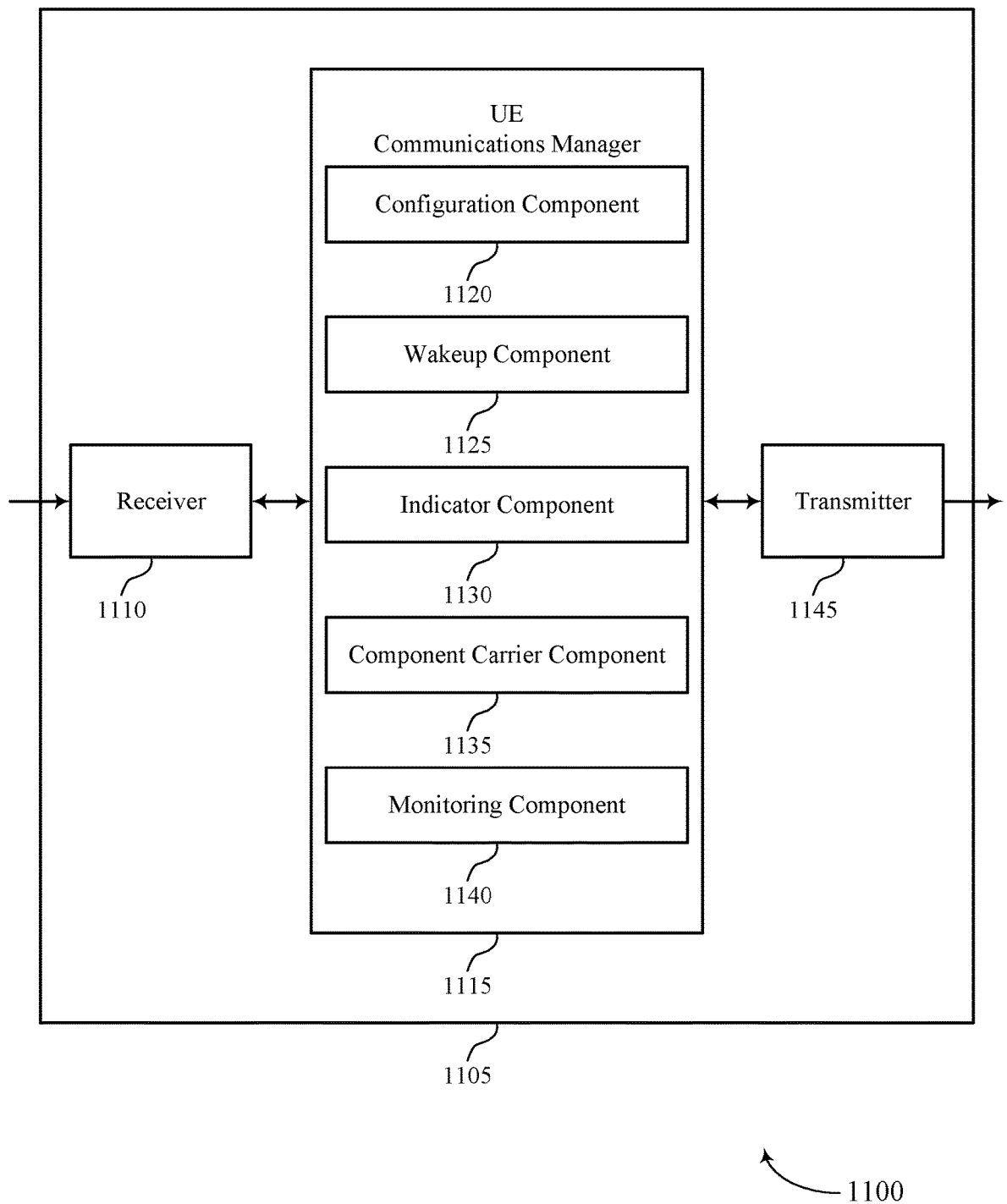

FIG. 11 shows a block diagram 1100 of a device 1105 that supports discontinuous reception wakeup operation with multiple component carriers in accordance with aspects of the present disclosure. The device 1105 may be an example of aspects of a device 1005, or a UE 115 as described herein. The device 1105 may include a receiver 1110, a UE communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to discontinuous reception wakeup operation with multiple component carriers, etc.). Information may be passed on to other components of the device 1105. The receiver 1110 may be an example of aspects of the transceiver 1320 described with reference to FIG. 13. The receiver 1110 may utilize a single antenna or a set of antennas.

The UE communications manager 1115 may be an example of aspects of the UE communications manager 1015 as described herein. The UE communications manager 1115 may include a configuration component 1120, a wakeup component 1125, an indicator component 1130, a component carrier component 1135, and a monitoring component 1140. The UE communications manager 1115 may be an example of aspects of the UE communications manager 1310 described herein.

The configuration component 1120 may receive configuration signaling configuring the UE with a set of carrier aggregation wakeup configurations. The wakeup component 1125 may receive, while operating in a discontinuous reception mode, a wakeup signal using at least one component carrier. The indicator component 1130 may identify a configuration indicator indicating a first carrier aggregation wakeup configuration of the set of carrier aggregation wakeup configurations based on the wakeup signal. The component carrier component 1135 may identify a second component carrier based on the first carrier aggregation wakeup configuration. The monitoring component 1140 may monitor a control channel of the second component carrier based on the first carrier aggregation wakeup configuration.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
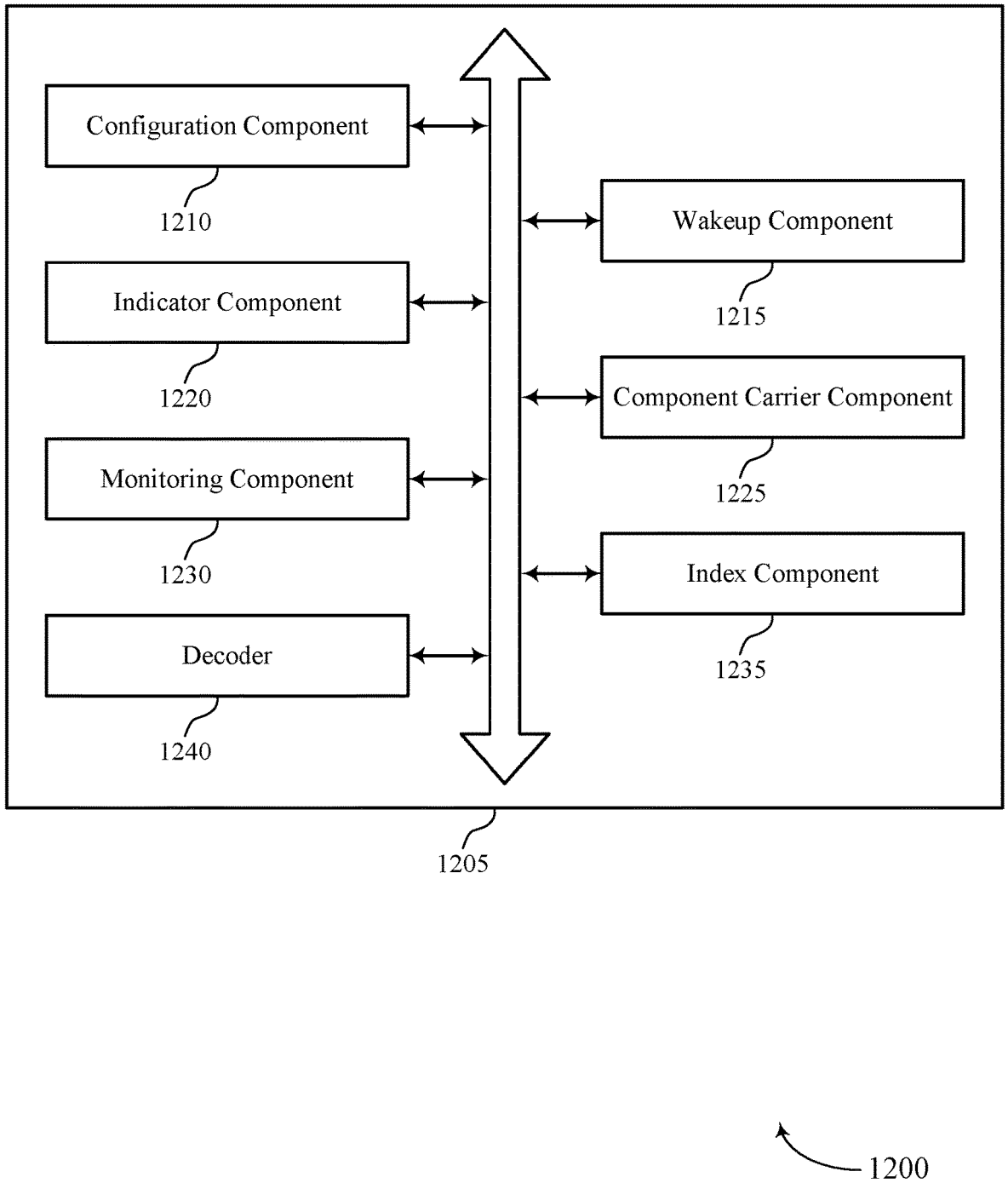
FIG. 12 shows a block diagram of a communications manager that supports discontinuous reception wakeup operation with multiple component carriers in accordance with aspects of the present disclosure.

FIG. 12 shows a block diagram 1200 of a UE communications manager 1205 that supports discontinuous reception wakeup operation with multiple component carriers in accordance with aspects of the present disclosure. The UE communications manager 1205 may be an example of aspects of a UE communications manager 1015, a UE communications manager 1115, or a UE communications manager 1310 described herein. The UE communications manager 1205 may include a configuration component 1210, a wakeup component 1215, an indicator component 1220, a component carrier component 1225, a monitoring component 1230, an index component 1235, and a decoder 1240. Each of these modules may communicate, directly or indirectly, with one another (e.g., via one or more buses).

The configuration component 1210 may receive configuration signaling configuring the UE with a set of carrier aggregation wakeup configurations. The wakeup component 1215 may receive, while operating in a discontinuous reception mode, a wakeup signal using at least one component carrier. The indicator component 1220 may identify a configuration indicator indicating a first carrier aggregation wakeup configuration of the set of carrier aggregation wakeup configurations based on the wakeup signal. The indicator component 1220 may identify the configuration indicator from a set of different configuration indicators that corresponds to a first decoding hypothesis of the set of different decoding hypotheses used to decode the bit sequence. In some examples, the indicator component 1220 may determine that a bit sequence decoded from the wakeup signal in accordance with a first resource element mapping pattern of a set of different resource element mapping patterns passes error detection.

In some examples, the indicator component 1220 may identify the configuration indicator from a set of different configuration indicators based on the first resource element mapping pattern. In some examples, the indicator component 1220 may apply a set of scrambling sequences to the bit sequence to generate a set of scrambled bit sequences. In some examples, the indicator component 1220 may determine a first scrambled bit sequence of the set of scrambled bit sequences passes error detection. In some examples, the indicator component 1220 may identify the configuration indicator from a set of different configuration indicators based on the first scrambled bit sequence.

In some examples, the indicator component 1220 may apply a set of root sequences to the bit sequence to generate a set of root bit sequences. In some examples, the indicator component 1220 may determine a first root bit sequence of the set of root bit sequences passes error detection. In some examples, the indicator component 1220 may identify the configuration indicator from a set of different configuration indicators based on the first root bit sequence. In some examples, the indicator component 1220 may determine a first bit sequence of the set of bit sequences passes error detection. In some examples, the indicator component 1220 may identify the configuration indicator from a set of different configuration indicators based on the first bit sequence.

The component carrier component 1225 may identify a second component carrier based on the first carrier aggregation wakeup configuration. The monitoring component 1230 may monitor a control channel of the second component carrier based on the first carrier aggregation wakeup configuration. In some examples, the monitoring component 1230 may monitor a control channel of the second component carrier based on the at least one parameter.

In some examples, the monitoring component 1230 may monitor a defined bandwidth part of the at least one component carrier for the wakeup signal. In some examples, the monitoring component 1230 may monitor, for the duration of the monitoring state, the control channel of the second component carrier. In some examples, the monitoring component 1230 may monitor, for the duration of the monitoring state, each monitoring occasion of the second control channel of the second component carrier based on the monitoring occasion periodicity. In some examples, the monitoring component 1230 may monitor, for the duration of the monitoring state, one or more control channel monitoring candidates of the second control channel based on the number of control channel monitoring candidates. In some examples, the monitoring component 1230 may monitor, in accordance with a beam sweeping pattern, a set of beams that each include a beamformed transmission of the wakeup signal.

The index component 1235 may index a table, based on the configuration indicator, for identifying at least one parameter of the first carrier aggregation wakeup configuration, where monitoring the wakeup signal resource further includes. The decoder 1240 may decode the wakeup signal to obtain the configuration indicator. In some examples, the decoder 1240 may channel decoding the wakeup signal to obtain the configuration indicator. In some examples, the decoder 1240 may perform blind decoding of the wakeup signal using at least one of the set of different decoding hypotheses to obtain a bit sequence that passes error detection. In some examples, the decoder 1240 may decode the wakeup signal to obtain a bit sequence. In some examples, the decoder 1240 may decode the wakeup signal to obtain a set of bit sequences based on applying a set of respective phase shifts to the wakeup signal.

Figure 13:
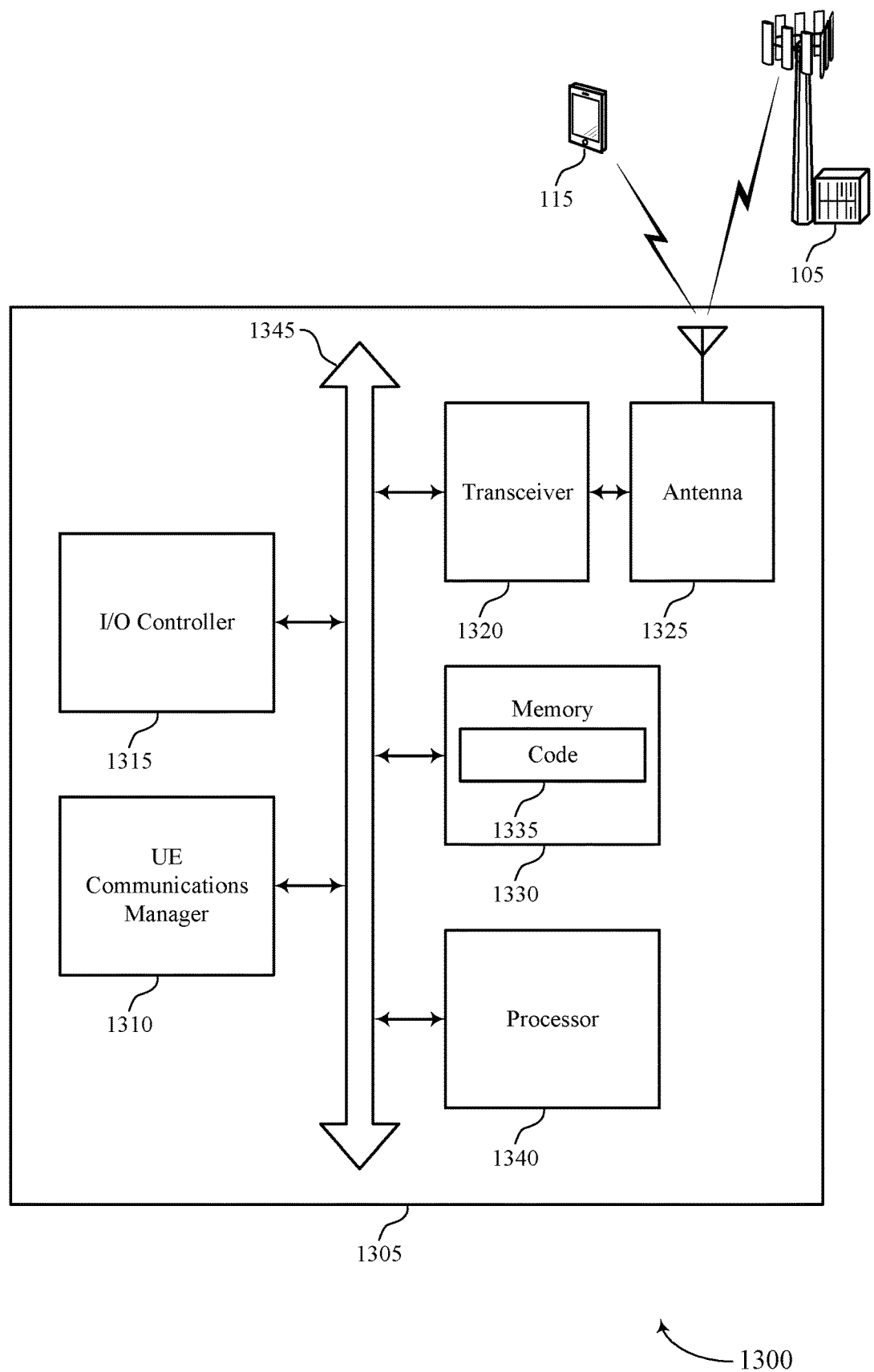
FIG. 13 shows a diagram of a system including a device that supports discontinuous reception wakeup operation with multiple component carriers in accordance with aspects of the present disclosure.

FIG. 13 shows a diagram of a system 1300 including a device 1305 that supports discontinuous reception wakeup operation with multiple component carriers in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a UE communications manager 1310, an I/O controller 1315, a transceiver 1320, an antenna 1325, memory 1330, and a processor 1340. These components may be in electronic communication via one or more buses (e.g., bus 1345).

The UE communications manager 1310 may receive configuration signaling configuring the UE with a set of carrier aggregation wakeup configurations, receive, while operating in a discontinuous reception mode, a wakeup signal using at least one component carrier, identify a configuration indicator indicating a first carrier aggregation wakeup configuration of the set of carrier aggregation wakeup configurations based on the wakeup signal, identify a second component carrier based on the first carrier aggregation wakeup configuration, and monitor a control channel of the second component carrier based on the first carrier aggregation wakeup configuration.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases the device 1305 may have more than one antenna 1325, which may be capable of concurrently transmitting or receiving multiple wireless transmissions.

The memory 1330 may include random access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting discontinuous reception wakeup operation with multiple component carriers).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
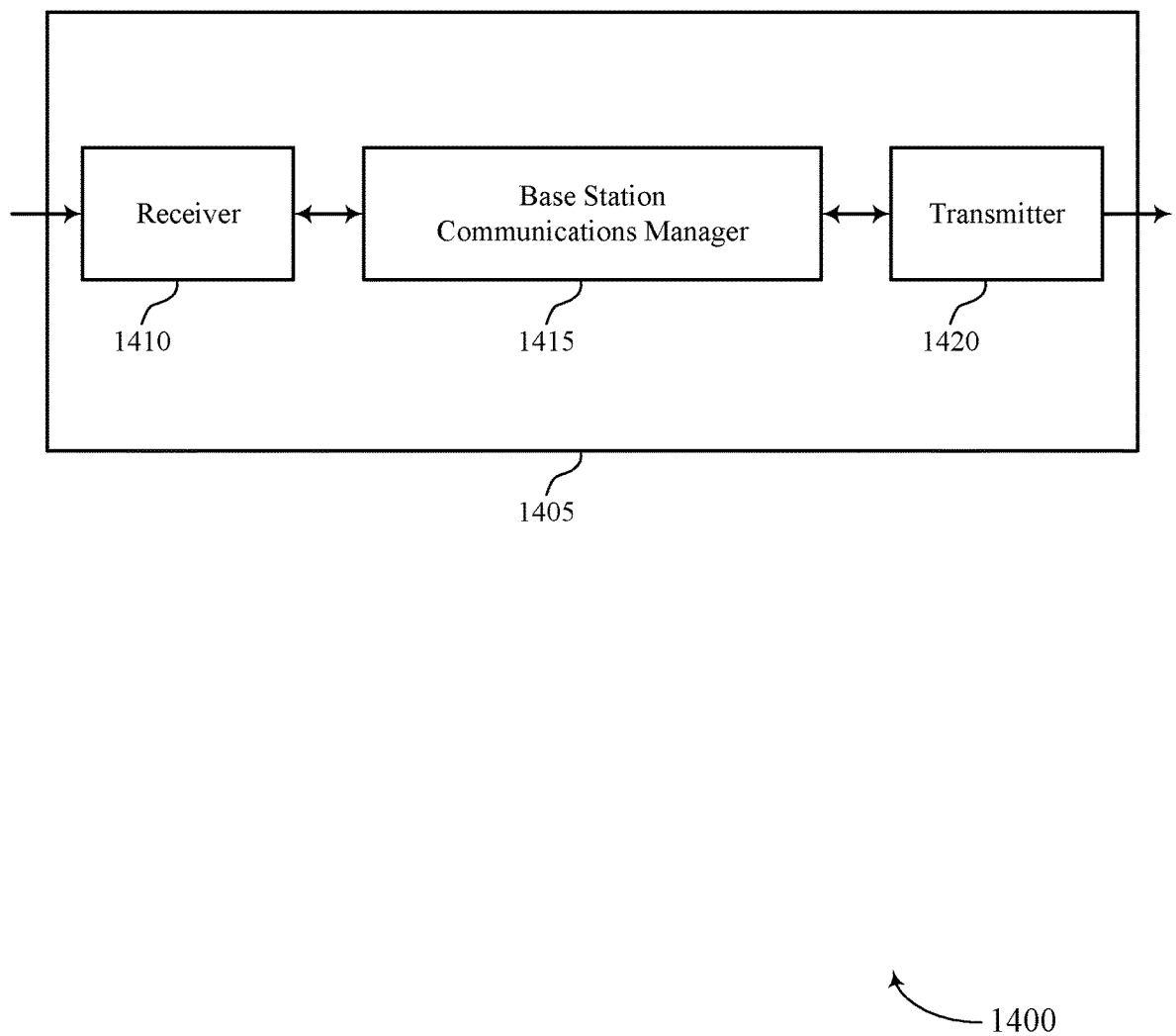
FIGS. 14 and 15 show block diagrams of devices that support discontinuous reception wakeup operation with multiple component carriers in accordance with aspects of the present disclosure.

FIG. 14 shows a block diagram 1400 of a device 1405 that supports discontinuous reception wakeup operation with multiple component carriers in accordance with aspects of the present disclosure. The device 1405 may be an example of aspects of a base station 105 as described herein. The device 1405 may include a receiver 1410, a base station communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to discontinuous reception wakeup operation with multiple component carriers, etc.). Information may be passed on to other components of the device 1405. The receiver 1410 may be an example of aspects of the transceiver 1720 described with reference to FIG. 17. The receiver 1410 may utilize a single antenna or a set of antennas.

The base station communications manager 1415 may transmit configuration signaling configuring a UE with a set of carrier aggregation wakeup configurations, transmit, using at least one component carrier, a wakeup signal to indicate a first carrier aggregation wakeup configuration of a set of carrier aggregation wakeup configurations, and transmit control information via a control channel of a second component carrier based on the first carrier aggregation wakeup configuration. The base station communications manager 1415 may be an example of aspects of the base station communications manager 1710 described herein.

The base station communications manager 1415, or its sub-components, may be implemented in hardware, code (e.g., software or firmware) executed by a processor, or any combination thereof. If implemented in code executed by a processor, the functions of the base station communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1415, or its sub-components, may be physically located at various positions, including being distributed such that portions of functions are implemented at different physical locations by one or more physical components. In some examples, the base station communications manager 1415, or its sub-components, may be a separate and distinct component in accordance with various aspects of the present disclosure. In some examples, the base station communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
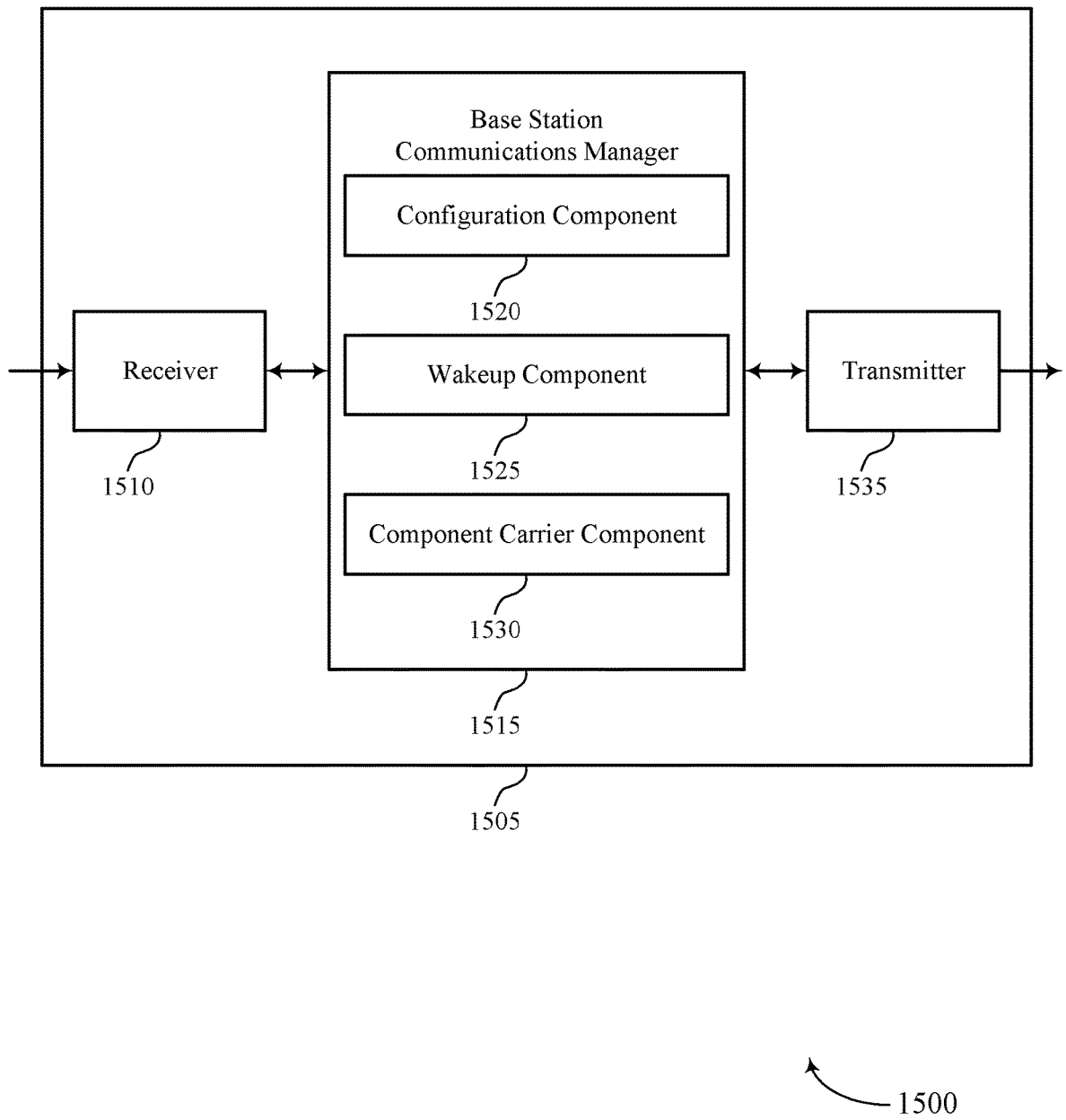

FIG. 15 shows a block diagram 1500 of a device 1505 that supports discontinuous reception wakeup operation with multiple component carriers in accordance with aspects of the present disclosure. The device 1505 may be an example of aspects of a device 1405, or a base station 105 as described herein. The device 1505 may include a receiver 1510, a base station communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to discontinuous reception wakeup operation with multiple component carriers, etc.). Information may be passed on to other components of the device 1505. The receiver 1510 may be an example of aspects of the transceiver 1720 described with reference to FIG. 17. The receiver 1510 may utilize a single antenna or a set of antennas.

The base station communications manager 1515 may be an example of aspects of the base station communications manager 1415 as described herein. The base station communications manager 1515 may include a configuration component 1520, a wakeup component 1525, and a component carrier component 1530. The base station communications manager 1515 may be an example of aspects of the base station communications manager 1710 described herein.

The configuration component 1520 may transmit configuration signaling configuring a UE with a set of carrier aggregation wakeup configurations. The wakeup component 1525 may transmit, using at least one component carrier, a wakeup signal to indicate a first carrier aggregation wakeup configuration of a set of carrier aggregation wakeup configurations. The component carrier component 1530 may transmit control information via a control channel of a second component carrier based on the first carrier aggregation wakeup configuration.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
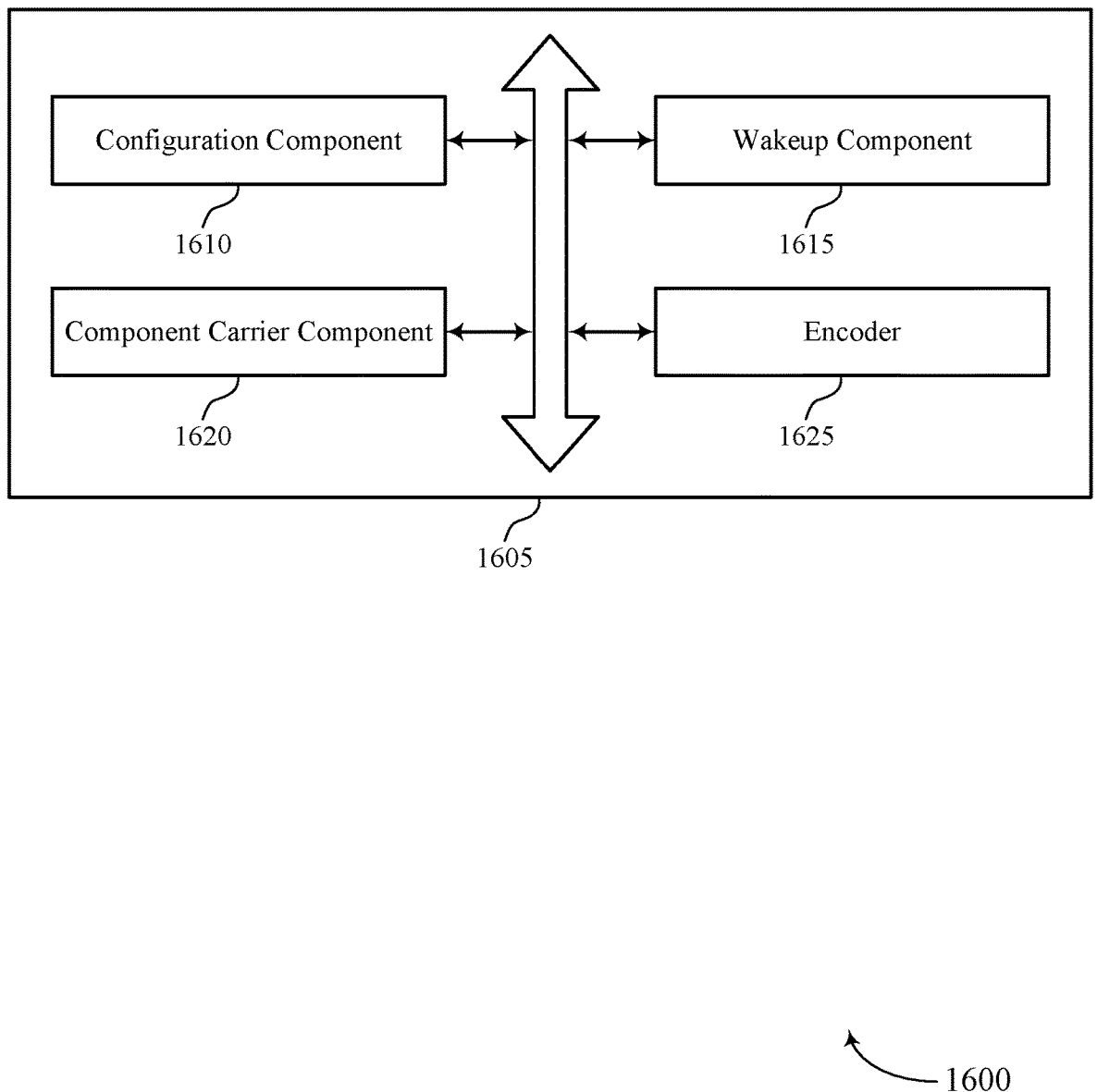
FIG. 16 shows a block diagram of a communications manager that supports discontinuous reception wakeup operation with multiple component carriers in accordance with aspects of the present disclosure.

FIG. 16 shows a block diagram 1600 of a base station communications manager 1605 that supports discontinuous reception wakeup operation with multiple component carriers in accordance with aspects of the present disclosure. The base station communications manager 1605 may be an example of aspects of a base station communications manager 1415, a base station communications manager 1515, or a base station communications manager 1710 described herein. The base station communications manager 1605 may include a configuration component 1610, a wakeup component 1615, a component carrier component 1620, and an encoder 1625. Each of these modules may communicate, directly or indirectly, with one another (e.g., via one or more buses).

The configuration component 1610 may transmit configuration signaling configuring a UE with a set of carrier aggregation wakeup configurations.

The wakeup component 1615 may transmit, using at least one component carrier, a wakeup signal to indicate a first carrier aggregation wakeup configuration of a set of carrier aggregation wakeup configurations. In some examples, the wakeup component 1615 may transmit the wakeup signal within a defined bandwidth part of the at least one component carrier. In some examples, the wakeup component 1615 may generate the wakeup signal based on the channel encoded sequence. In some examples, the wakeup component 1615 may transmit the wakeup signal in accordance with a first resource element mapping pattern of a set of different resource element mapping patterns.

In some examples, the wakeup component 1615 may scramble a bit sequence based on a first scrambling sequence of a set of scrambling sequences. In some examples, the wakeup component 1615 may generate the wakeup signal based on the scrambled bit sequence. In some examples, the wakeup component 1615 may apply a first root sequence of a set of root sequences to a bit sequence to generate a root bit sequence. In some examples, the wakeup component 1615 may generate the wakeup signal based on the root bit sequence. In some examples, the wakeup component 1615 may apply a first phase shift of a set of different phase shifts to the wakeup signal. In some examples, the wakeup component 1615 may transmit the phase shifted wakeup signal.

The component carrier component 1620 may transmit control information via a control channel of a second component carrier based on the first carrier aggregation wakeup configuration. In some examples, the component carrier component 1620 may transmit the control information via the control channel of the second component carrier based on the duration of the monitoring state. In some examples, the component carrier component 1620 may transmit the control information via the second control channel of the second component carrier based on each monitoring occasion of the second control channel. In some examples, the component carrier component 1620 may transmit the control information via the second control channel of the second component carrier within at least one of the control channel monitoring candidates of the second control channel. In some examples, the component carrier component 1620 may transmit, in accordance with a beam sweeping pattern, a set of beams that each include a beamformed transmission of the wakeup signal.

The encoder 1625 may channel encoding a configuration indicator to generate a channel encoded sequence. In some examples, the encoder 1625 may encode the configuration indicator with a polar code to generate the channel encoded sequence.

Figure 17:
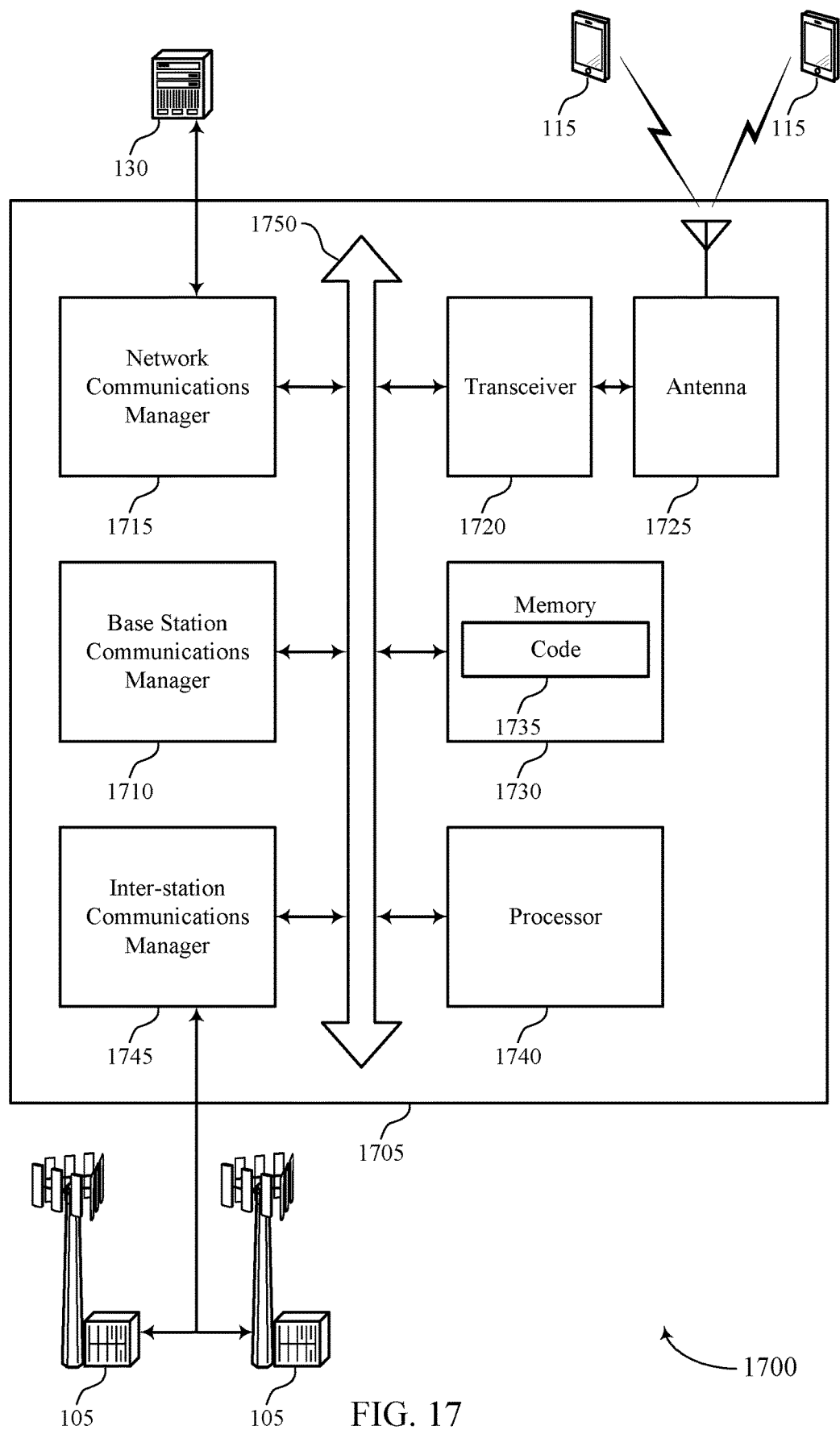
FIG. 17 shows a diagram of a system including a device that supports discontinuous reception wakeup operation with multiple component carriers in accordance with aspects of the present disclosure.

FIG. 17 shows a diagram of a system 1700 including a device 1705 that supports discontinuous reception wakeup operation with multiple component carriers in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a base station communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The base station communications manager 1710 may transmit configuration signaling configuring a UE with a set of carrier aggregation wakeup configurations, transmit, using at least one component carrier, a wakeup signal to indicate a first carrier aggregation wakeup configuration of a set of carrier aggregation wakeup configurations, and transmit control information via a control channel of a second component carrier based on the first carrier aggregation wakeup configuration.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas. In some cases, the device 1705 may include a single antenna 1725. However, in some cases the device 1705 may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting discontinuous reception wakeup operation with multiple component carriers).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
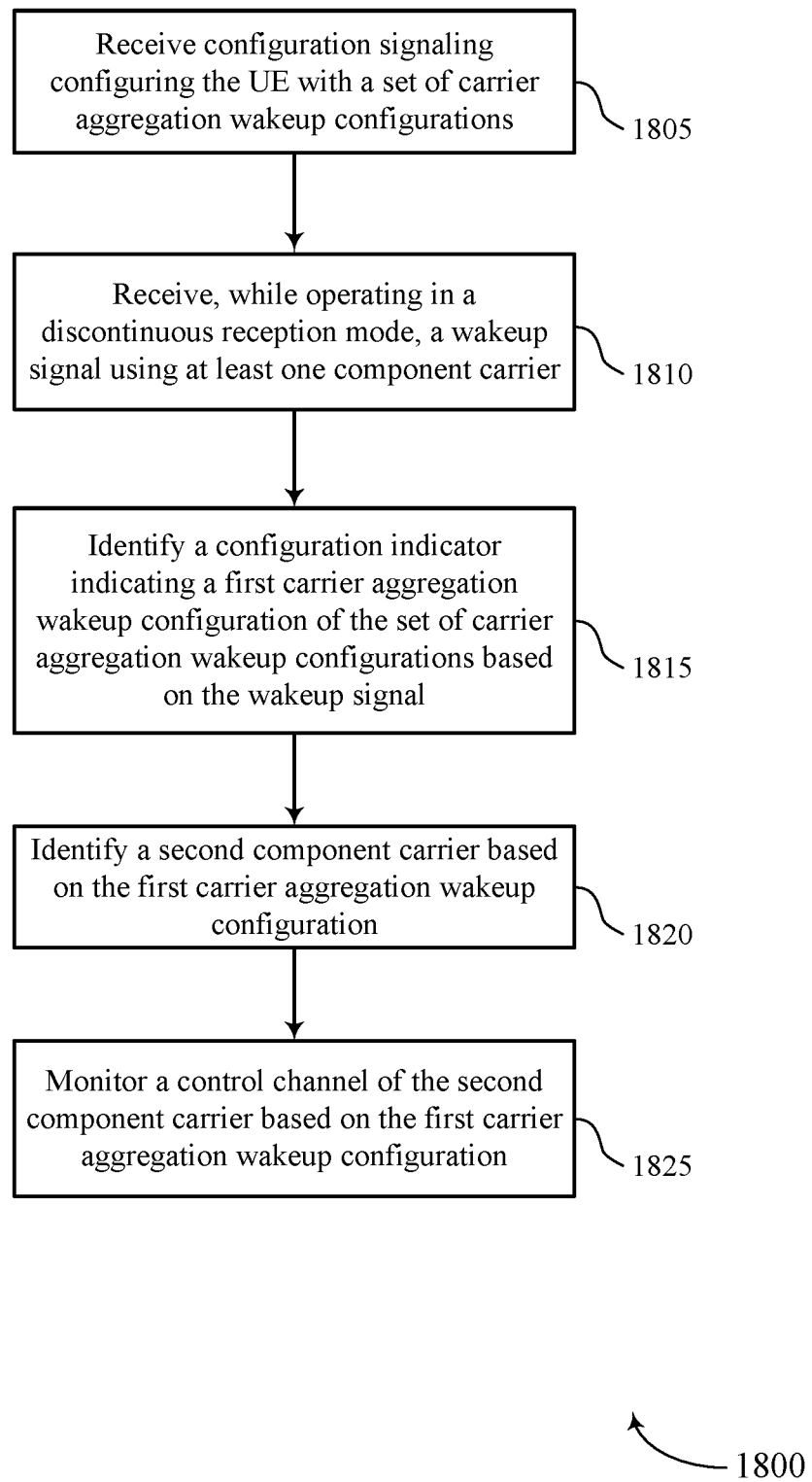
FIGS. 18 through 27 show flowcharts illustrating methods that support discontinuous reception wakeup operation with multiple component carriers in accordance with aspects of the present disclosure.

FIG. 18 shows a flowchart illustrating a method 1800 that supports discontinuous reception wakeup operation with multiple component carriers in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1805, the UE may receive configuration signaling configuring the UE with a set of carrier aggregation wakeup configurations. The operations of 1805 may be performed according to the methods described herein. In some examples, aspects of the operations of 1805 may be performed by a configuration component as described with reference to FIGS. 10 through 13.

At 1810, the UE may receive, while operating in a discontinuous reception mode, a wakeup signal using at least one component carrier. The operations of 1810 may be performed according to the methods described herein. In some examples, aspects of the operations of 1810 may be performed by a wakeup component as described with reference to FIGS. 10 through 13.

At 1815, the UE may identify a configuration indicator indicating a first carrier aggregation wakeup configuration of the set of carrier aggregation wakeup configurations based on the wakeup signal. The operations of 1815 may be performed according to the methods described herein. In some examples, aspects of the operations of 1815 may be performed by an indicator component as described with reference to FIGS. 10 through 13.

At 1820, the UE may identify a second component carrier based on the first carrier aggregation wakeup configuration. The operations of 1820 may be performed according to the methods described herein. In some examples, aspects of the operations of 1820 may be performed by a component carrier component as described with reference to FIGS. 10 through 13.

At 1825, the UE may monitor a control channel of the second component carrier based on the first carrier aggregation wakeup configuration. The operations of 1825 may be performed according to the methods described herein. In some examples, aspects of the operations of 1825 may be performed by a monitoring component as described with reference to FIGS. 10 through 13.

Figure 19:
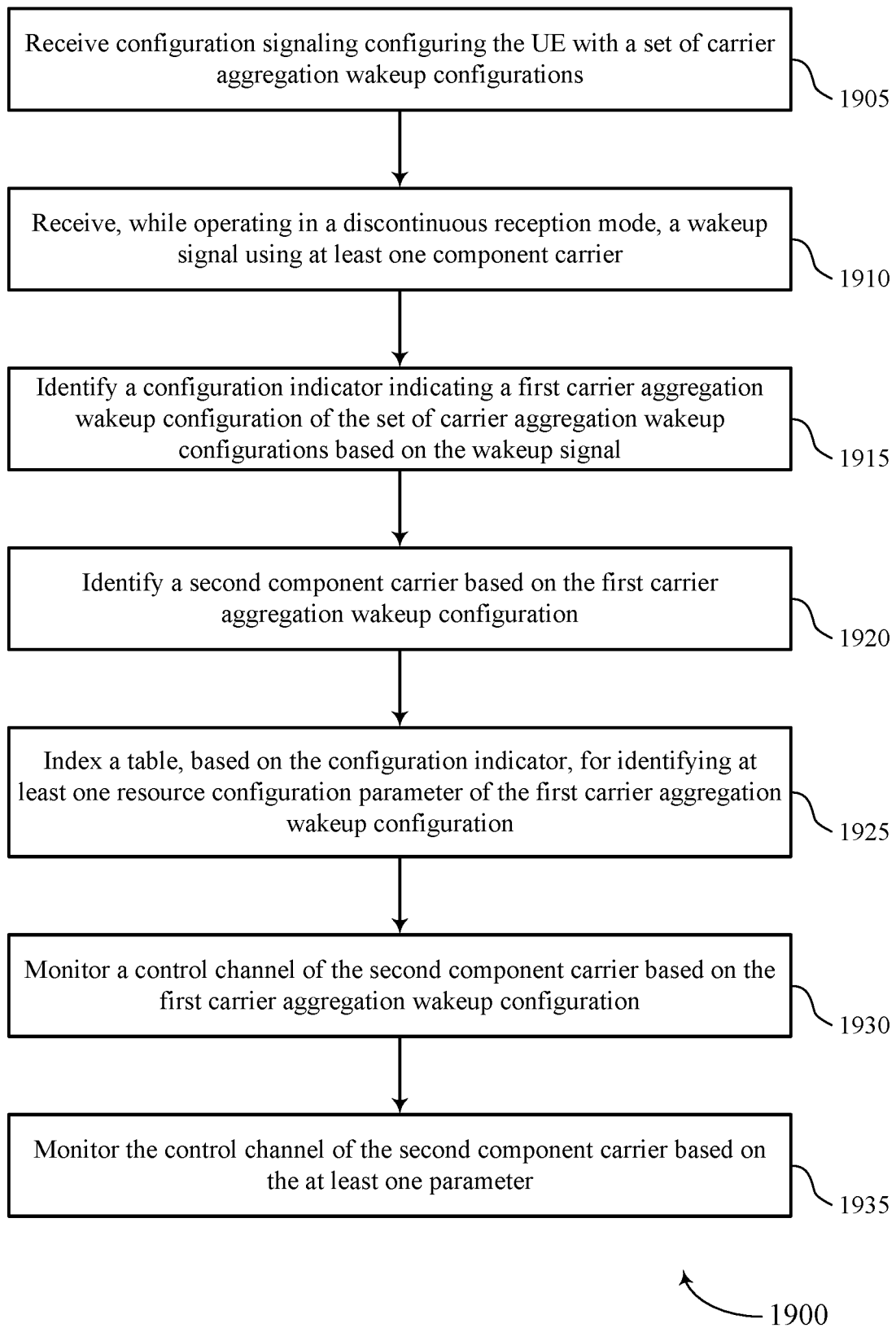

FIG. 19 shows a flowchart illustrating a method 1900 that supports discontinuous reception wakeup operation with multiple component carriers in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1905, the UE may receive configuration signaling configuring the UE with a set of carrier aggregation wakeup configurations. The operations of 1905 may be performed according to the methods described herein. In some examples, aspects of the operations of 1905 may be performed by a configuration component as described with reference to FIGS. 10 through 13.

At 1910, the UE may receive, while operating in a discontinuous reception mode, a wakeup signal using at least one component carrier. The operations of 1910 may be performed according to the methods described herein. In some examples, aspects of the operations of 1910 may be performed by a wakeup component as described with reference to FIGS. 10 through 13.

At 1915, the UE may identify a configuration indicator indicating a first carrier aggregation wakeup configuration of the set of carrier aggregation wakeup configurations based on the wakeup signal. The operations of 1915 may be performed according to the methods described herein. In some examples, aspects of the operations of 1915 may be performed by an indicator component as described with reference to FIGS. 10 through 13.

At 1920, the UE may identify a second component carrier based on the first carrier aggregation wakeup configuration. The operations of 1920 may be performed according to the methods described herein. In some examples, aspects of the operations of 1920 may be performed by a component carrier component as described with reference to FIGS. 10 through 13.

At 1925, the UE may index a table, based on the configuration indicator, for identifying at least one parameter of the first carrier aggregation wakeup configuration, where monitoring the wakeup signal resource further includes. The operations of 1925 may be performed according to the methods described herein. In some examples, aspects of the operations of 1925 may be performed by an index component as described with reference to FIGS. 10 through 13.

At 1930, the UE may monitor a control channel of the second component carrier based on the first carrier aggregation wakeup configuration. The operations of 1930 may be performed according to the methods described herein. In some examples, aspects of the operations of 1930 may be performed by a monitoring component as described with reference to FIGS. 10 through 13.

At 1935, the UE may monitor the control channel of the second component carrier based on the at least one parameter. The operations of 1935 may be performed according to the methods described herein. In some examples, aspects of the operations of 1935 may be performed by a monitoring component as described with reference to FIGS. 10 through 13.

Figure 20:
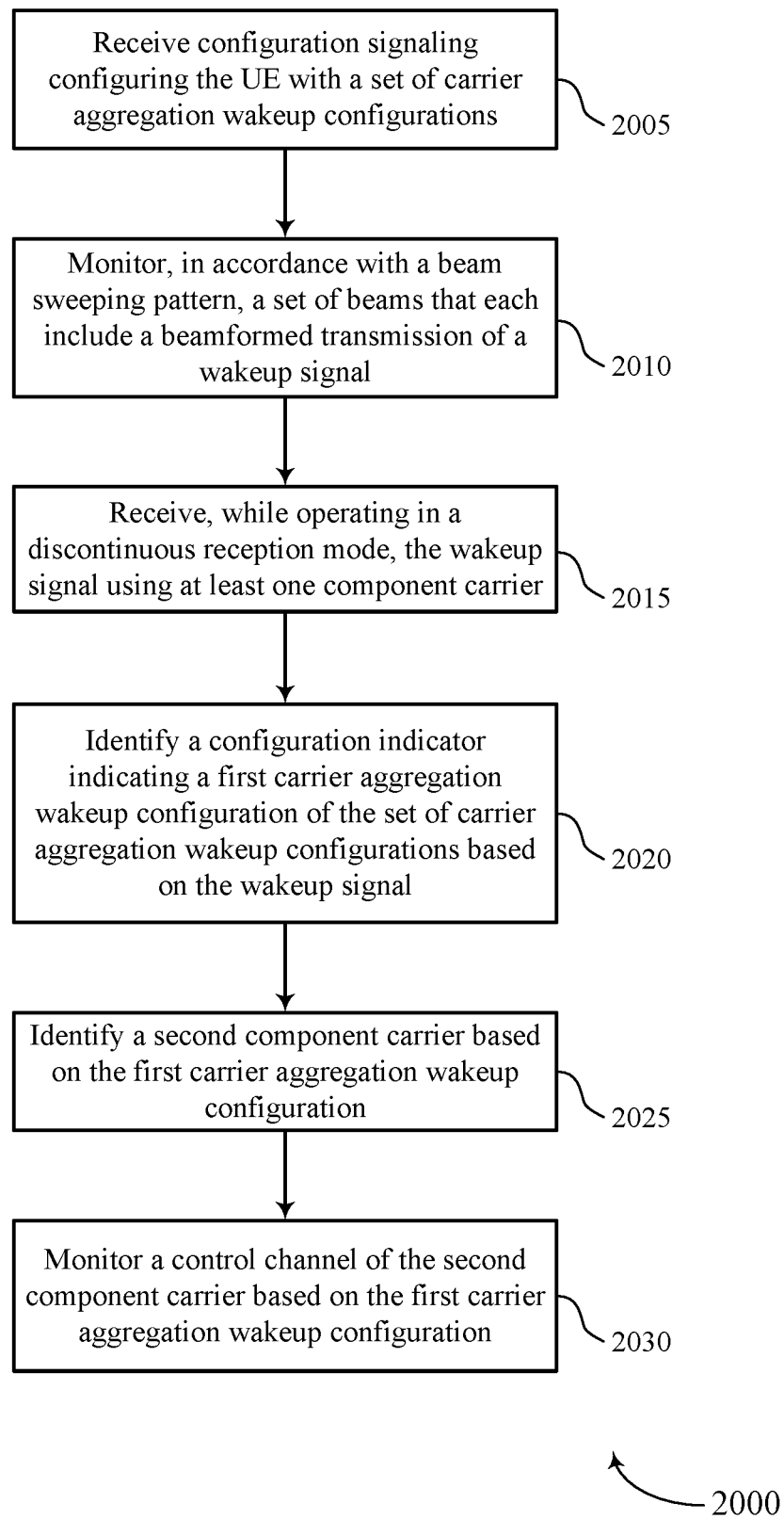

FIG. 20 shows a flowchart illustrating a method 2000 that supports discontinuous reception wakeup operation with multiple component carriers in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2005, the UE may receive configuration signaling configuring the UE with a set of carrier aggregation wakeup configurations. The operations of 2005 may be performed according to the methods described herein. In some examples, aspects of the operations of 2005 may be performed by a configuration component as described with reference to FIGS. 10 through 13.

At 2010, the UE may monitor, in accordance with a beam sweeping pattern, a set of beams that each include a beamformed transmission of a wakeup signal. The operations of 2010 may be performed according to the methods described herein. In some examples, aspects of the operations of 2010 may be performed by a monitoring component as described with reference to FIGS. 10 through 13.

At 2015, the UE may receive, while operating in a discontinuous reception mode, the wakeup signal using at least one component carrier. The operations of 2015 may be performed according to the methods described herein. In some examples, aspects of the operations of 2015 may be performed by a wakeup component as described with reference to FIGS. 10 through 13.

At 2020, the UE may identify a configuration indicator indicating a first carrier aggregation wakeup configuration of the set of carrier aggregation wakeup configurations based on the wakeup signal. The operations of 2020 may be performed according to the methods described herein. In some examples, aspects of the operations of 2020 may be performed by an indicator component as described with reference to FIGS. 10 through 13.

At 2025, the UE may identify a second component carrier based on the first carrier aggregation wakeup configuration. The operations of 2025 may be performed according to the methods described herein. In some examples, aspects of the operations of 2025 may be performed by a component carrier component as described with reference to FIGS. 10 through 13.

At 2030, the UE may monitor a control channel of the second component carrier based on the first carrier aggregation wakeup configuration. The operations of 2030 may be performed according to the methods described herein. In some examples, aspects of the operations of 2030 may be performed by a monitoring component as described with reference to FIGS. 10 through 13.

Figure 21:
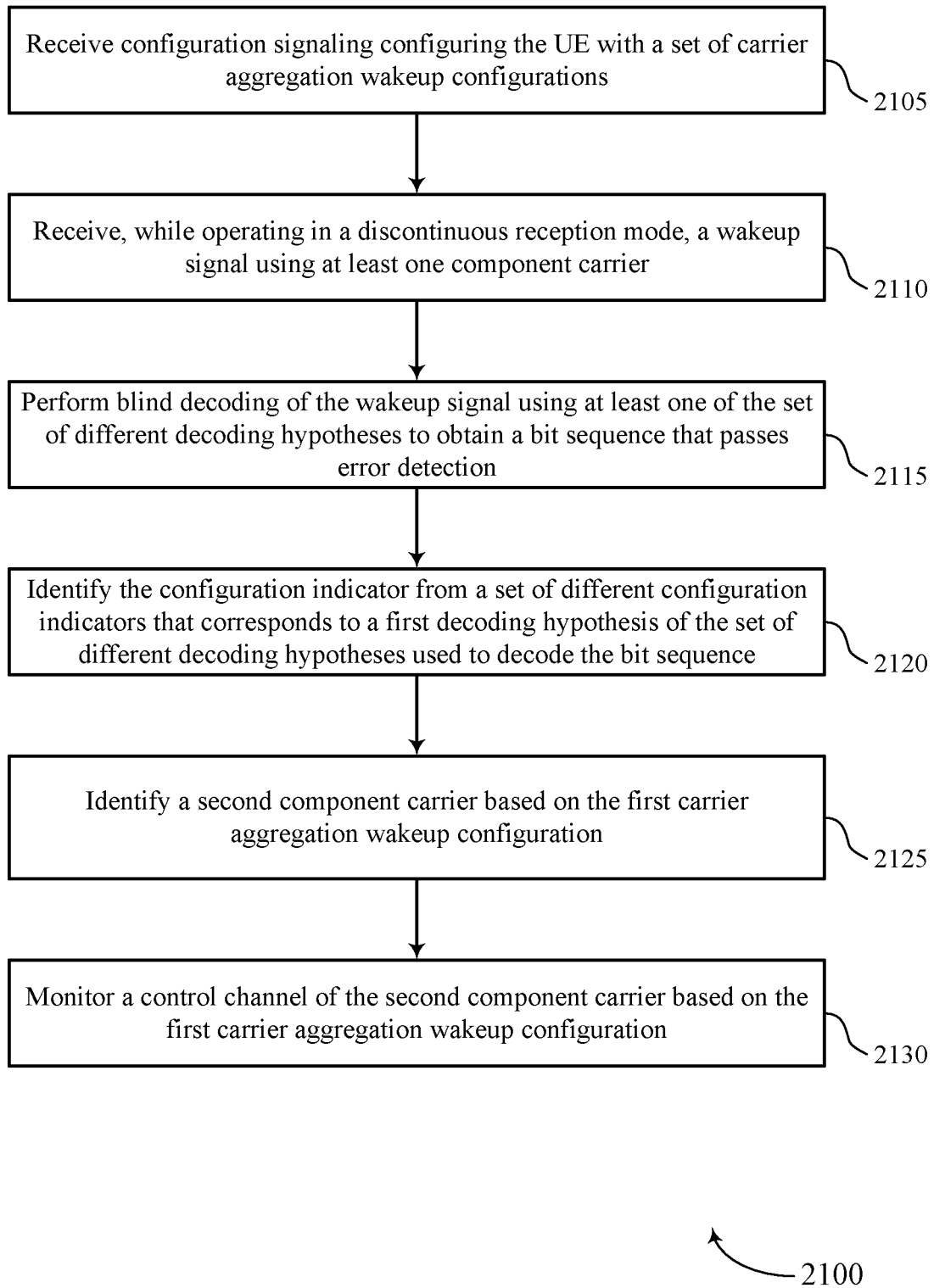

FIG. 21 shows a flowchart illustrating a method 2100 that supports discontinuous reception wakeup operation with multiple component carriers in accordance with aspects of the present disclosure. The operations of method 2100 may be implemented by a UE 115 or its components as described herein. For example, the operations of method 2100 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2105, the UE may receive configuration signaling configuring the UE with a set of carrier aggregation wakeup configurations. The operations of 2105 may be performed according to the methods described herein. In some examples, aspects of the operations of 2105 may be performed by a configuration component as described with reference to FIGS. 10 through 13.

At 2110, the UE may receive, while operating in a discontinuous reception mode, a wakeup signal using at least one component carrier. The operations of 2110 may be performed according to the methods described herein. In some examples, aspects of the operations of 2110 may be performed by a wakeup component as described with reference to FIGS. 10 through 13.

At 2115, the UE may perform blind decoding of the wakeup signal using at least one of the set of different decoding hypotheses to obtain a bit sequence that passes error detection. The operations of 2115 may be performed according to the methods described herein. In some examples, aspects of the operations of 2115 may be performed by a decoder as described with reference to FIGS. 10 through 13.

At 2120, the UE may identify the configuration indicator from a set of different configuration indicators that corresponds to a first decoding hypothesis of the set of different decoding hypotheses used to decode the bit sequence. The operations of 2120 may be performed according to the methods described herein. In some examples, aspects of the operations of 2120 may be performed by an indicator component as described with reference to FIGS. 10 through 13.

At 2125, the UE may identify a second component carrier based on the first carrier aggregation wakeup configuration. The operations of 2125 may be performed according to the methods described herein. In some examples, aspects of the operations of 2125 may be performed by a component carrier component as described with reference to FIGS. 10 through 13.

At 2135, the UE may monitor a control channel of the second component carrier based on the first carrier aggregation wakeup configuration. The operations of 2135 may be performed according to the methods described herein. In some examples, aspects of the operations of 2135 may be performed by a monitoring component as described with reference to FIGS. 10 through 13.

Figure 22:
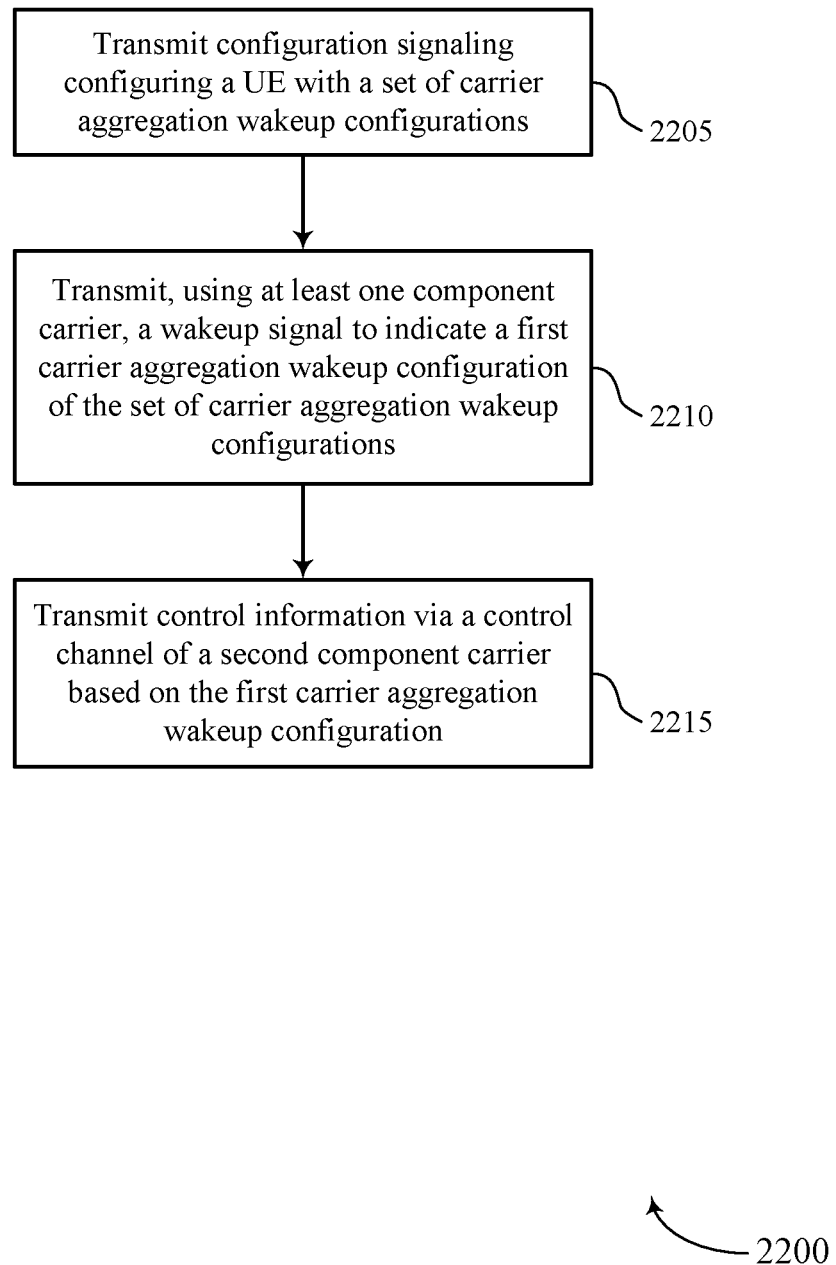

FIG. 22 shows a flowchart illustrating a method 2200 that supports discontinuous reception wakeup operation with multiple component carriers in accordance with aspects of the present disclosure. The operations of method 2200 may be implemented by a base station 105 or its components as described herein. For example, the operations of method 2200 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2205, the base station may transmit configuration signaling configuring a UE with a set of carrier aggregation wakeup configurations. The operations of 2205 may be performed according to the methods described herein. In some examples, aspects of the operations of 2205 may be performed by a configuration component as described with reference to FIGS. 14 through 17.

At 2210, the base station may transmit, using at least one component carrier, a wakeup signal to indicate a first carrier aggregation wakeup configuration of a set of carrier aggregation wakeup configurations. The operations of 2210 may be performed according to the methods described herein. In some examples, aspects of the operations of 2210 may be performed by a wakeup component as described with reference to FIGS. 14 through 17.

At 2215, the base station may transmit control information via a control channel of a second component carrier based on the first carrier aggregation wakeup configuration. The operations of 2215 may be performed according to the methods described herein. In some examples, aspects of the operations of 2215 may be performed by a component carrier component as described with reference to FIGS. 14 through 17.

Figure 23:
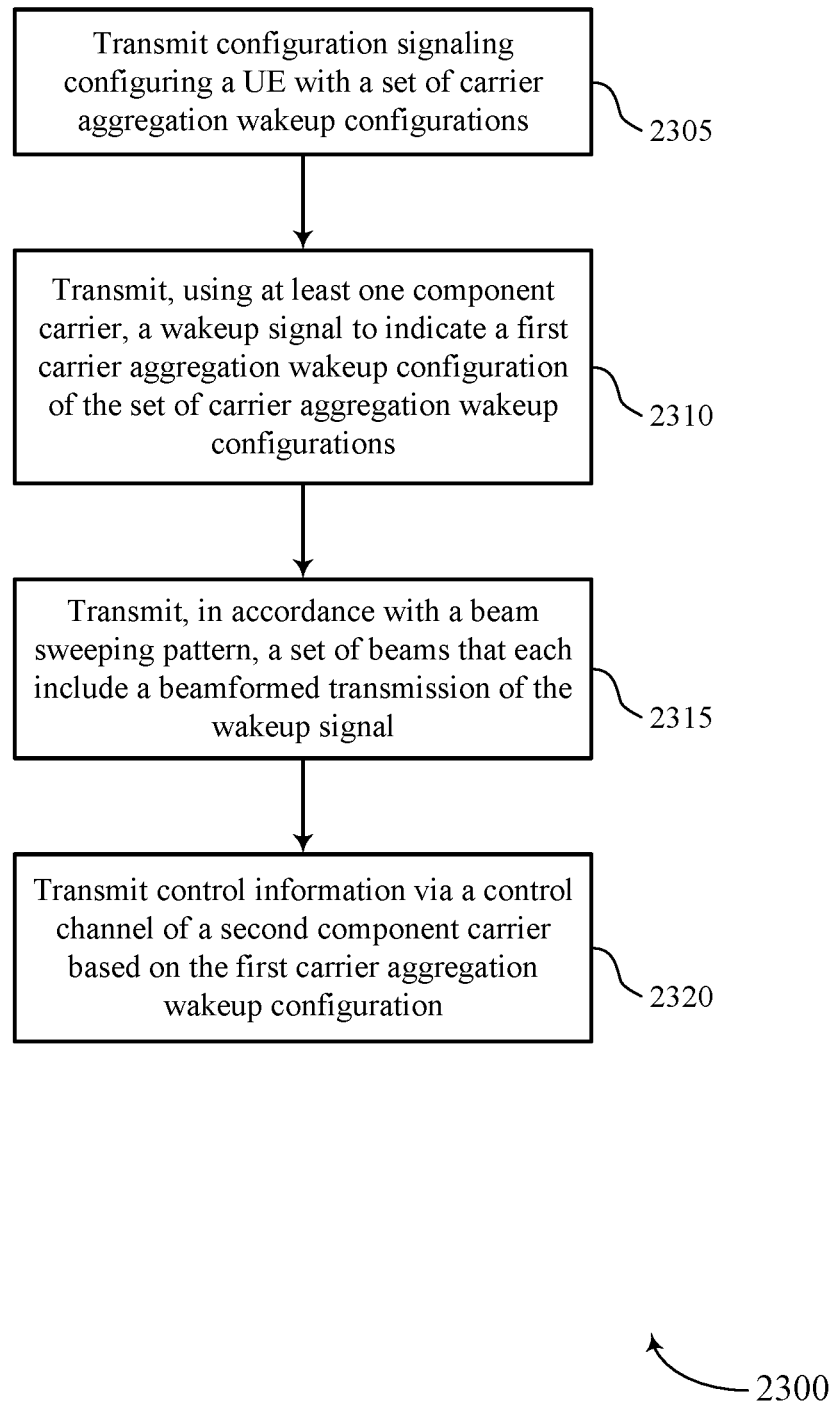

FIG. 23 shows a flowchart illustrating a method 2300 that supports discontinuous reception wakeup operation with multiple component carriers in accordance with aspects of the present disclosure. The operations of method 2300 may be implemented by a base station 105 or its components as described herein. For example, the operations of method 2300 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2305, the base station may transmit configuration signaling configuring a UE with a set of carrier aggregation wakeup configurations. The operations of 2305 may be performed according to the methods described herein. In some examples, aspects of the operations of 2305 may be performed by a configuration component as described with reference to FIGS. 14 through 17.

At 2310, the base station may transmit, using at least one component carrier, a wakeup signal to indicate a first carrier aggregation wakeup configuration of a set of carrier aggregation wakeup configurations. The operations of 2310 may be performed according to the methods described herein. In some examples, aspects of the operations of 2310 may be performed by a wakeup component as described with reference to FIGS. 14 through 17.

At 2315, the base station may transmit, in accordance with a beam sweeping pattern, a set of beams that each include a beamformed transmission of the wakeup signal. The operations of 2315 may be performed according to the methods described herein. In some examples, aspects of the operations of 2315 may be performed by a component carrier component as described with reference to FIGS. 14 through 17.

At 2320, the base station may transmit control information via a control channel of a second component carrier based on the first carrier aggregation wakeup configuration. The operations of 2320 may be performed according to the methods described herein. In some examples, aspects of the operations of 2320 may be performed by a component carrier component as described with reference to FIGS. 14 through 17.

Figure 24:
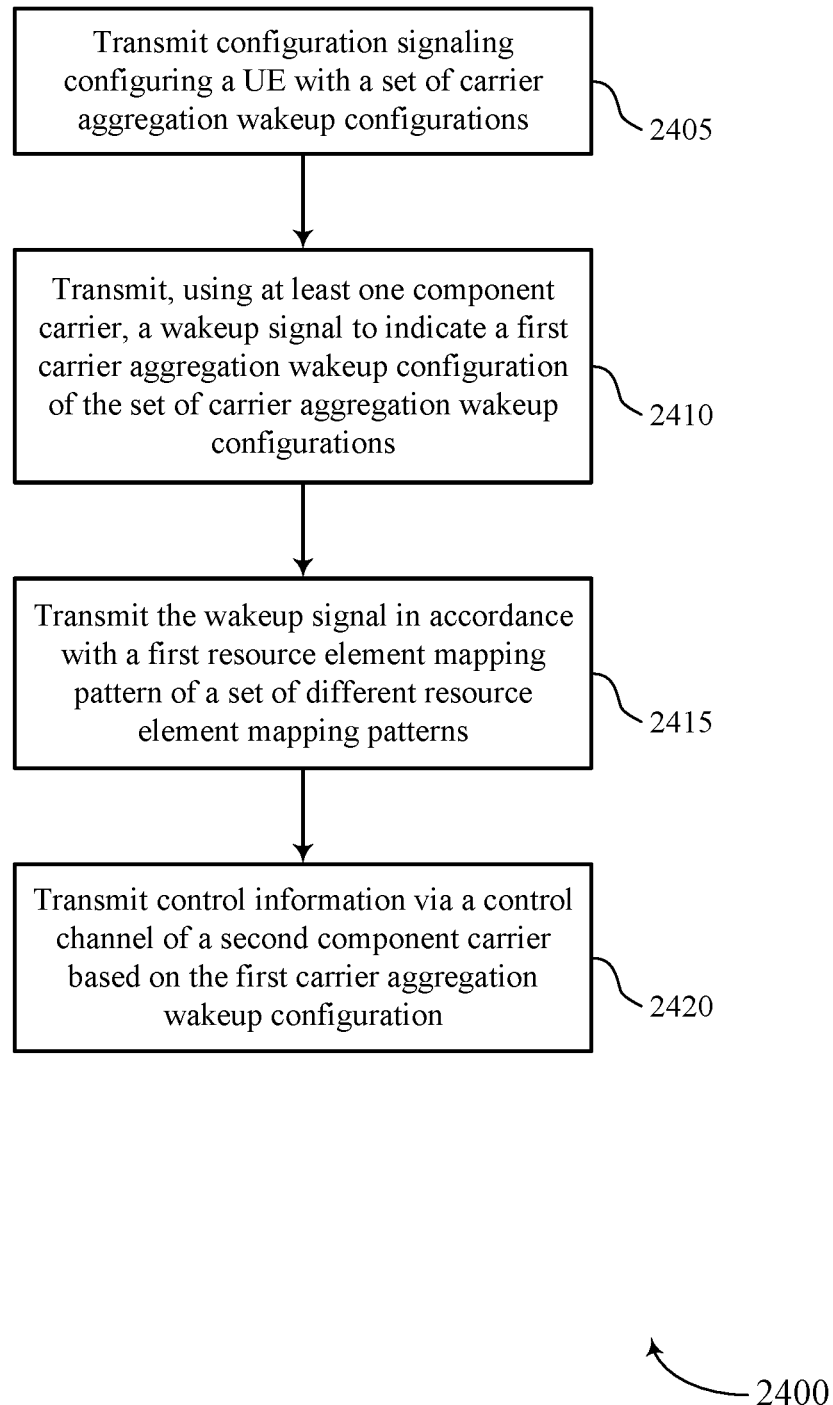

FIG. 24 shows a flowchart illustrating a method 2400 that supports discontinuous reception wakeup operation with multiple component carriers in accordance with aspects of the present disclosure. The operations of method 2400 may be implemented by a base station 105 or its components as described herein. For example, the operations of method 2400 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2405, the base station may transmit configuration signaling configuring a UE with a set of carrier aggregation wakeup configurations. The operations of 2405 may be performed according to the methods described herein. In some examples, aspects of the operations of 2405 may be performed by a configuration component as described with reference to FIGS. 14 through 17.

At 2410, the base station may transmit, using at least one component carrier, a wakeup signal to indicate a first carrier aggregation wakeup configuration of a set of carrier aggregation wakeup configurations. The operations of 2410 may be performed according to the methods described herein. In some examples, aspects of the operations of 2410 may be performed by a wakeup component as described with reference to FIGS. 14 through 17.

At 2415, the base station may transmit the wakeup signal in accordance with a first resource element mapping pattern of a set of different resource element mapping patterns. The operations of 2415 may be performed according to the methods described herein. In some examples, aspects of the operations of 2415 may be performed by a wakeup component as described with reference to FIGS. 14 through 17.

At 2420, the base station may transmit control information via a control channel of a second component carrier based on the first carrier aggregation wakeup configuration. The operations of 2420 may be performed according to the methods described herein. In some examples, aspects of the operations of 2420 may be performed by a component carrier component as described with reference to FIGS. 14 through 17.

Figure 25:
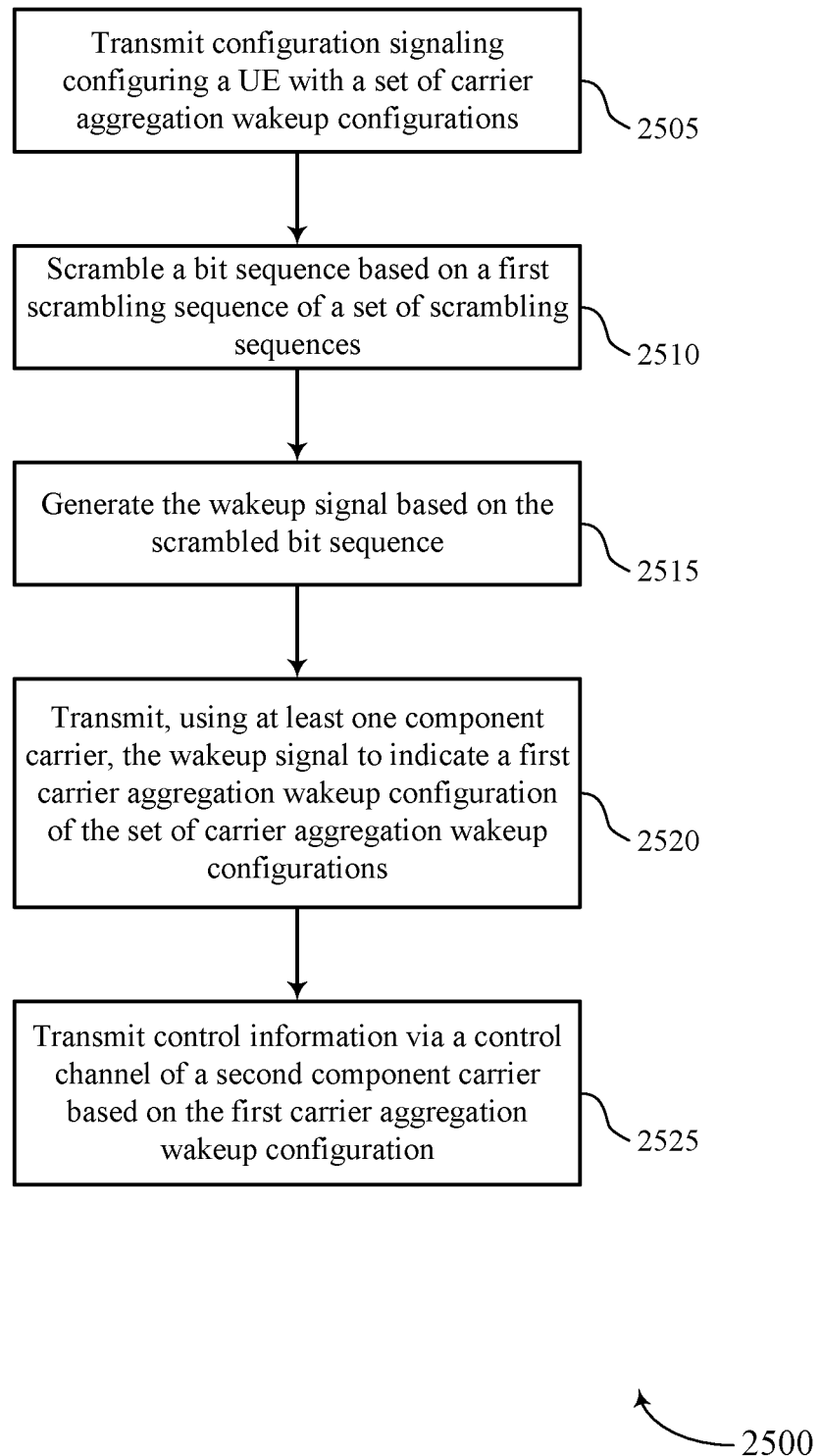

FIG. 25 shows a flowchart illustrating a method 2500 that supports discontinuous reception wakeup operation with multiple component carriers in accordance with aspects of the present disclosure. The operations of method 2500 may be implemented by a base station 105 or its components as described herein. For example, the operations of method 2500 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2505, the base station may transmit configuration signaling configuring a UE with a set of carrier aggregation wakeup configurations. The operations of 2505 may be performed according to the methods described herein. In some examples, aspects of the operations of 2505 may be performed by a configuration component as described with reference to FIGS. 14 through 17.

At 2510, the base station may scramble a bit sequence based on a first scrambling sequence of a set of scrambling sequences. The operations of 2510 may be performed according to the methods described herein. In some examples, aspects of the operations of 2510 may be performed by a wakeup component as described with reference to FIGS. 14 through 17.

At 2515, the base station may generate the wakeup signal based on the scrambled bit sequence. The operations of 2515 may be performed according to the methods described herein. In some examples, aspects of the operations of 2515 may be performed by a wakeup component as described with reference to FIGS. 14 through 17.

At 2520, the base station may transmit, using at least one component carrier, the wakeup signal to indicate a first carrier aggregation wakeup configuration of a set of carrier aggregation wakeup configurations. The operations of 2520 may be performed according to the methods described herein. In some examples, aspects of the operations of 2520 may be performed by a wakeup component as described with reference to FIGS. 14 through 17.

At 2525, the base station may transmit control information via a control channel of a second component carrier based on the first carrier aggregation wakeup configuration. The operations of 2525 may be performed according to the methods described herein. In some examples, aspects of the operations of 2525 may be performed by a component carrier component as described with reference to FIGS. 14 through 17.

Figure 26:
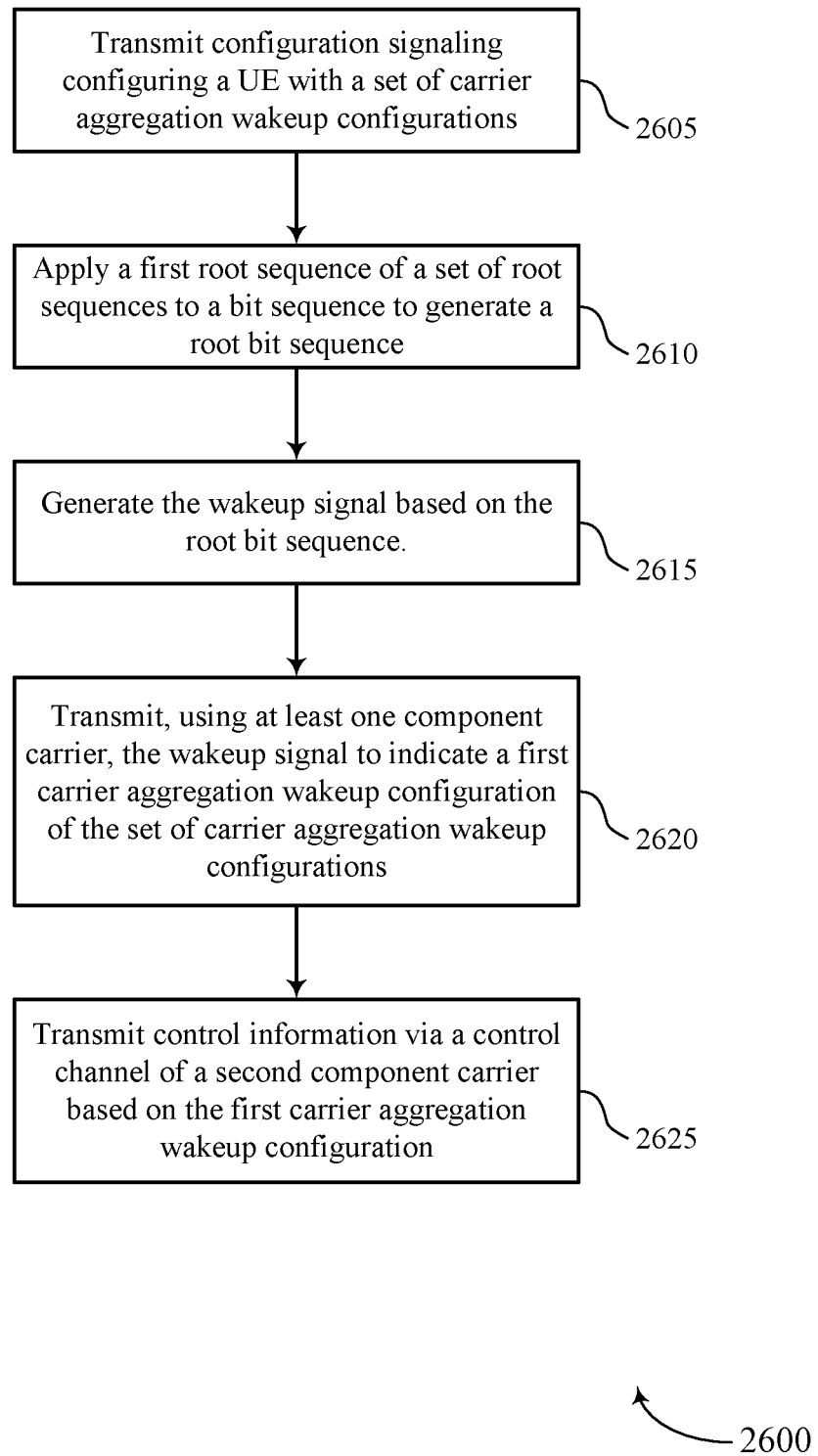

FIG. 26 shows a flowchart illustrating a method 2600 that supports discontinuous reception wakeup operation with multiple component carriers in accordance with aspects of the present disclosure. The operations of method 2600 may be implemented by a base station 105 or its components as described herein. For example, the operations of method 2600 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2605, the base station may transmit configuration signaling configuring a UE with a set of carrier aggregation wakeup configurations. The operations of 2605 may be performed according to the methods described herein. In some examples, aspects of the operations of 2605 may be performed by a configuration component as described with reference to FIGS. 14 through 17.

At 2610, the base station may apply a first root sequence of a set of root sequences to a bit sequence to generate a root bit sequence. The operations of 2610 may be performed according to the methods described herein. In some examples, aspects of the operations of 2610 may be performed by a wakeup component as described with reference to FIGS. 14 through 17.

At 2615, the base station may generate the wakeup signal based on the root bit sequence. The operations of 2615 may be performed according to the methods described herein. In some examples, aspects of the operations of 2615 may be performed by a wakeup component as described with reference to FIGS. 14 through 17.

At 2620, the base station may transmit, using at least one component carrier, the wakeup signal to indicate a first carrier aggregation wakeup configuration of a set of carrier aggregation wakeup configurations. The operations of 2620 may be performed according to the methods described herein. In some examples, aspects of the operations of 2620 may be performed by a wakeup component as described with reference to FIGS. 14 through 17.

At 2625, the base station may transmit control information via a control channel of a second component carrier based on the first carrier aggregation wakeup configuration. The operations of 2625 may be performed according to the methods described herein. In some examples, aspects of the operations of 2625 may be performed by a component carrier component as described with reference to FIGS. 14 through 17.

Figure 27:
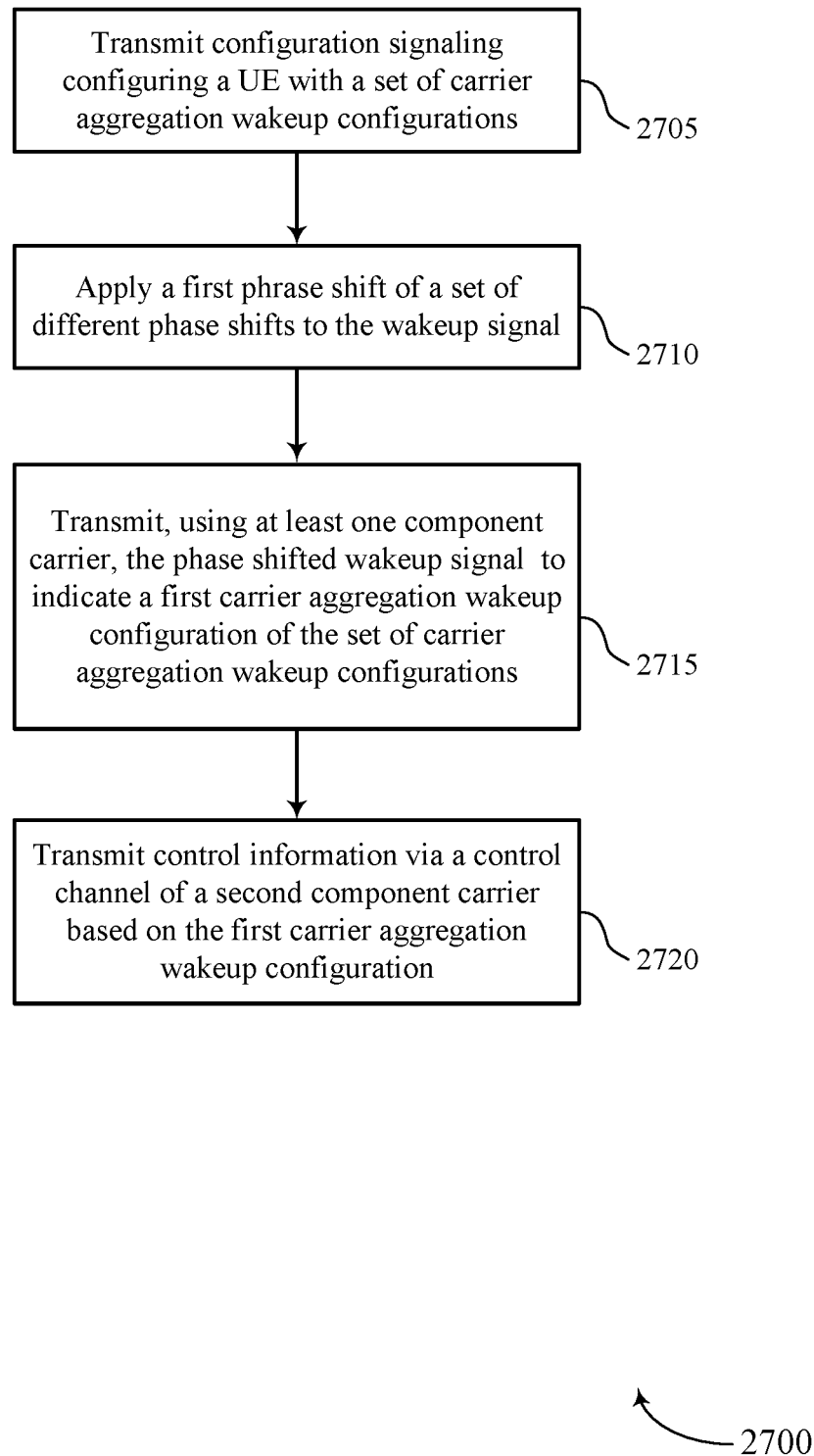

FIG. 27 shows a flowchart illustrating a method 2700 that supports discontinuous reception wakeup operation with multiple component carriers in accordance with aspects of the present disclosure. The operations of method 2700 may be implemented by a base station 105 or its components as described herein. For example, the operations of method 2700 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2705, the base station may transmit configuration signaling configuring a UE with a set of carrier aggregation wakeup configurations. The operations of 2705 may be performed according to the methods described herein. In some examples, aspects of the operations of 2705 may be performed by a configuration component as described with reference to FIGS. 14 through 17.

At 2710, the base station may apply a first phase shift of a set of different phase shifts to the wakeup signal. The operations of 2710 may be performed according to the methods described herein. In some examples, aspects of the operations of 2710 may be performed by a wakeup component as described with reference to FIGS. 14 through 17.

At 2715, the base station may transmit, using at least one component carrier, the phase shifted wakeup signal to indicate a first carrier aggregation wakeup configuration of a set of carrier aggregation wakeup configurations. The operations of 2715 may be performed according to the methods described herein. In some examples, aspects of the operations of 2715 may be performed by a wakeup component as described with reference to FIGS. 14 through 17.

At 2720, the base station may transmit control information via a control channel of a second component carrier based on the first carrier aggregation wakeup configuration. The operations of 2720 may be performed according to the methods described herein. In some examples, aspects of the operations of 2720 may be performed by a component carrier component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving configuration signaling configuring the UE with a plurality of carrier aggregation wakeup configurations;
   receiving, while operating in a discontinuous reception mode, a wakeup signal using at least one component carrier;
   identifying a configuration indicator, in the received wakeup signal, indicating a first carrier aggregation wakeup configuration of the plurality of carrier aggregation wakeup configurations;
   identifying a second component carrier based at least in part on the first carrier aggregation wakeup configuration; and
   monitoring a control channel of the second component carrier based at least in part on the first carrier aggregation wakeup configuration.

2. The method of claim 1, wherein the first carrier aggregation wakeup configuration indicates an identifier of at least one bandwidth part of the at least one component carrier, an identifier of at least one bandwidth part of the second component carrier, or both.

3. The method of claim 1, further comprising:
   indexing a table, based at least in part on the configuration indicator, for identifying at least one parameter of the first carrier aggregation wakeup configuration; and
   monitoring the control channel of the second component carrier based at least in part on the at least one parameter.

4. The method of claim 1, wherein receiving the wakeup signal using the at least one component carrier further comprises:
   monitoring a defined bandwidth part of the at least one component carrier for the wakeup signal.

5. The method of claim 1, wherein the first carrier aggregation wakeup configuration indicates a duration of a monitoring state within a discontinuous reception (DRX) cycle, and wherein monitoring the control channel of the second component carrier further comprises:

monitoring, for the duration of the monitoring state, the control channel of the second component carrier.

6. The method of claim 5, wherein the first carrier aggregation wakeup configuration indicates a monitoring occasion periodicity for the control channel, and wherein monitoring the control channel of the second component carrier further comprises:

monitoring, for the duration of the monitoring state, each monitoring occasion of the control channel of the second component carrier based at least in part on the monitoring occasion periodicity.

7. The method of claim 5, wherein the first carrier aggregation wakeup configuration indicates a number of control channel monitoring candidates for the control channel, wherein monitoring the control channel of the second component carrier further comprises:

monitoring, for the duration of the monitoring state, one or more control channel monitoring candidates of the control channel based at least in part on the number of control channel monitoring candidates.

8. The method of claim 1, wherein receiving the wakeup signal using the at least one component carrier further comprises:

monitoring, in accordance with a beam sweeping pattern, a plurality of beams that each include a beamformed transmission of the wakeup signal.

9. The method of claim 1, wherein the wakeup signal is encoded with a polar code.

10. The method of claim 1, wherein identifying the configuration indicator further comprises:

determining that a bit sequence decoded from the wakeup signal in accordance with a first resource element mapping pattern of a plurality of different resource element mapping patterns passes error detection, wherein each resource element mapping pattern of the plurality of different resource element mapping patterns corresponds to a respective decoding hypothesis; and identifying the configuration indicator from a plurality of different configuration indicators based at least in part on the first resource element mapping pattern.

11. The method of claim 10, wherein the first resource element mapping pattern of the plurality of different resource element mapping patterns indicates a beam sweeping pattern.

12. The method of claim 1, wherein identifying the configuration indicator further comprises:

decoding the wakeup signal to obtain a bit sequence;

applying a plurality of scrambling sequences to the bit sequence to generate a plurality of scrambled bit sequences;

determining a first scrambled bit sequence of the plurality of scrambled bit sequences passes error detection; and identifying the configuration indicator from a plurality of different configuration indicators based at least in part on the first scrambled bit sequence.

13. The method of claim 1, wherein identifying the configuration indicator further comprises:

decoding the wakeup signal to obtain a bit sequence;

applying a plurality of root sequences to the bit sequence to generate a plurality of root bit sequences;

determining a first root bit sequence of the plurality of root bit sequences passes error detection; and identifying the configuration indicator from a plurality of different configuration indicators based at least in part on the first root bit sequence.

14. The method of claim 1, wherein identifying the configuration indicator further comprises:

decoding the wakeup signal to obtain a plurality of bit sequences based at least in part on applying a plurality of respective phase shifts to the wakeup signal;

determining a first bit sequence of the plurality of bit sequences passes error detection; and identifying the configuration indicator from a plurality of different configuration indicators based at least in part on the first bit sequence.

15. The method of claim 1, wherein the first carrier aggregation wakeup configuration indicates an identifier of the second component carrier or an identifier of at least one additional component carrier.

16. The method of claim 1, wherein each carrier aggregation wakeup configuration of the plurality of carrier aggregation wakeup configurations indicates at least one component carrier to activate subsequent to receiving the wakeup signal.

17. The method of claim 1, wherein each carrier aggregation wakeup configuration of the plurality of carrier aggregation wakeup configurations indicates at least one bandwidth part on at least one component carrier to activate subsequent to receiving the wakeup signal.

18. A method for wireless communications at a base station, comprising:

transmitting configuration signaling configuring a user equipment (UE) with a plurality of carrier aggregation wakeup configurations;

transmitting, using at least one component carrier, a wakeup signal to indicate a first carrier aggregation wakeup configuration of the plurality of carrier aggregation wakeup configurations; and transmitting control information via a control channel of a second component carrier based at least in part on the first carrier aggregation wakeup configuration.

19. The method of claim 18, wherein the first carrier aggregation wakeup configuration indicates an identifier of at least one bandwidth part of the at least one component carrier, an identifier of at least one bandwidth part of the second component carrier, or both.

20. The method of claim 18, wherein the configuration signaling indicates a configuration of a table that comprises at least one parameter for each carrier aggregation wakeup configuration of the plurality of carrier aggregation wakeup configurations.

21. The method of claim 18, wherein transmitting, using the at least one component carrier, the wakeup signal further comprises:

transmitting the wakeup signal within a defined bandwidth part of the at least one component carrier.

22. The method of claim 18, wherein the first carrier aggregation wakeup configuration indicates a duration of a monitoring state within a discontinuous reception (DRX) cycle, and wherein transmitting the control information via the control channel of the second component carrier further comprises:

transmitting the control information via the control channel of the second component carrier based at least in part on the duration of the monitoring state.

23. The method of claim 18, wherein transmitting, using the at least one component carrier, the wakeup signal further comprises:

transmitting, in accordance with a beam sweeping pattern, a plurality of beams that each include a beamformed transmission of the wakeup signal.

24. The method of claim 18, further comprising:
channel encoding a configuration indicator to generate a channel encoded sequence; and
generating the wakeup signal based at least in part on the channel encoded sequence.

25. The method of claim 18, wherein transmitting, using the at least one component carrier, the wakeup signal further comprises:
transmitting the wakeup signal in accordance with a first resource element mapping pattern of a plurality of different resource element mapping patterns, wherein each resource element mapping pattern of the plurality of different resource element mapping patterns corresponds to a respective decoding hypothesis.

26. The method of claim 18, wherein transmitting, using the at least one component carrier, the wakeup signal further comprises:
scrambling a bit sequence based at least in part on a first scrambling sequence of a plurality of scrambling sequences; and
generating the wakeup signal based at least in part on the scrambled bit sequence.

27. The method of claim 18, wherein transmitting, using the at least one component carrier, the wakeup signal further comprises:
applying a first root sequence of a plurality of root sequences to a bit sequence to generate a root bit sequence; and
generating the wakeup signal based at least in part on the root bit sequence.

28. The method of claim 18, wherein transmitting, using the at least one component carrier, the wakeup signal further comprises:
applying a first phase shift of a plurality of different phase shifts to the wakeup signal; and
transmitting the phase shifted wakeup signal.

29. An apparatus for wireless communications, comprising: a processor, memory in electronic communication with the processor; and instructions stored in the memory and executable by the processor to cause the apparatus to:
receive configuration signaling configuring the apparatus with a plurality of carrier aggregation wakeup configurations;
receive, while operating in a discontinuous reception mode, a wakeup signal using at least one component carrier;
identify a configuration indicator, in the received wakeup signal, indicating a first carrier aggregation wakeup configuration of the plurality of carrier aggregation wakeup configurations;
identify a second component carrier based at least in part on the first carrier aggregation wakeup configuration; and
monitor a control channel of the second component carrier based at least in part on the first carrier aggregation wakeup configuration.

30. An apparatus for wireless communications, comprising: a processor, memory in electronic communication with the processor; and instructions stored in the memory and executable by the processor to cause the apparatus to:
transmit configuration signaling configuring a user equipment (UE) with a plurality of carrier aggregation wakeup configurations;
transmit, using at least one component carrier, a wakeup signal to indicate a first carrier aggregation wakeup configuration of the plurality of carrier aggregation wakeup configurations; and
transmit control information via a control channel of a second component carrier based at least in part on the first carrier aggregation wakeup configuration.

* * * * *